(12) United States Patent
Villaume

(10) Patent No.: US 10,367,934 B2
(45) Date of Patent: Jul. 30, 2019

(54) MOTOR VEHICLE SAFE DRIVING AND OPERATING DEVICES, MECHANISMS, SYSTEMS, AND METHODS

(71) Applicant: Edward Villaume, Minneapolis, MN (US)

(72) Inventor: Edward Villaume, Minneapolis, MN (US)

( * ) Notice: Subject to any disclaimer, the term of this patent is extended or adjusted under 35 U.S.C. 154(b) by 0 days.

(21) Appl. No.: 16/008,027

(22) Filed: Jun. 14, 2018

(65) Prior Publication Data

US 2018/0359354 A1   Dec. 13, 2018

Related U.S. Application Data

(60) Provisional application No. 62/519,130, filed on Jun. 13, 2017.

(51) Int. Cl.
*H04W 4/02* (2018.01)
*H04W 4/48* (2018.01)
*H04M 1/725* (2006.01)
*B60R 16/037* (2006.01)

(52) U.S. Cl.
CPC ..... *H04M 1/72577* (2013.01); *B60R 16/0373* (2013.01); *H04M 1/72569* (2013.01); *H04W 4/023* (2013.01); *H04W 4/48* (2018.02); *H04M 1/72552* (2013.01); *H04M 1/72572* (2013.01)

(58) Field of Classification Search
CPC ... B60R 1/04; B60R 2001/1253; B60R 11/04; B60R 2300/406; B60R 2300/804; B60R 2325/101; B60R 25/302; B60R 16/0373; B60S 1/0822; H04W 4/046; H04W 4/80; H04W 4/023; H04W 4/48; G07C 5/006; B60W 50/14; H04M 1/6083; H04M 1/72552; H04M 1/72569; H04M 1/72572; H04M 1/72577; G08G 1/0112; G02B 2027/0163
See application file for complete search history.

(56) References Cited

U.S. PATENT DOCUMENTS

| | | | |
|---|---|---|---|
| 2010/0216401 A1* | 8/2010 | Kitahara | H04M 1/6091 455/41.2 |
| 2012/0006611 A1* | 1/2012 | Wallace | H04M 1/67 180/272 |
| 2012/0109451 A1* | 5/2012 | Tan | G01C 21/3664 701/36 |
| 2012/0214471 A1* | 8/2012 | Tadayon | H04W 4/50 455/418 |
| 2012/0244883 A1* | 9/2012 | Tibbitts | H04W 48/04 455/456.2 |

(Continued)

*Primary Examiner* — Nizar N Sivji

(57) ABSTRACT

A motor vehicle safe driving device that provides a secure location to hold and store one or more mobile electronic devices while they are in a motor vehicle, thereby preventing the hands-on and visual distraction to the driver of the motor vehicle. Further, the motor vehicle safe driving device will monitor the location of mobile electronic devices while in a motor vehicle and if one is moved to close in proximity to the driver or if the display screen is shown to the driver, the motor vehicle safe driving device will render the display screen of the mobile electronic device black, and it can power-off the mobile electronic device. Further, the motor vehicle safe driving device can provide an all audible experience with all forms of communication.

23 Claims, 3 Drawing Sheets

(56) References Cited

U.S. PATENT DOCUMENTS

| | | | |
|---|---|---|---|
| 2013/0116012 A1* | 5/2013 | Okayasu | H04M 1/6091 455/566 |
| 2013/0137489 A1* | 5/2013 | Takikawa | H04W 4/50 455/566 |
| 2013/0295908 A1* | 11/2013 | Zeinstra | H04W 4/046 455/418 |
| 2014/0277935 A1* | 9/2014 | Daman | G08G 1/127 701/36 |
| 2014/0323111 A1* | 10/2014 | Ning | H04M 1/72577 455/418 |
| 2015/0039877 A1* | 2/2015 | Hall | G06F 1/32 713/2 |
| 2015/0116100 A1* | 4/2015 | Yang | G07C 9/00119 340/426.19 |
| 2015/0120136 A1* | 4/2015 | Jung | H04W 4/60 701/36 |
| 2015/0149042 A1* | 5/2015 | Cooper | B60R 16/037 701/48 |
| 2015/0204965 A1* | 7/2015 | Magarida | G01S 5/26 367/117 |
| 2016/0165034 A1* | 6/2016 | Nixon | H04M 1/72527 455/557 |
| 2016/0248905 A1* | 8/2016 | Miller | H04W 4/021 |
| 2017/0171734 A1* | 6/2017 | Lee | H04M 1/72538 |
| 2017/0188395 A1* | 6/2017 | Kim | H04W 4/046 |

\* cited by examiner

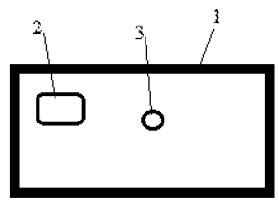
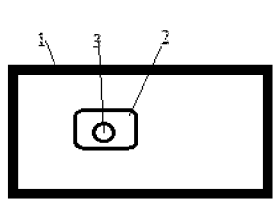
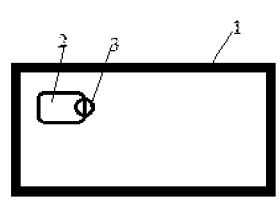
FIG. 1A     FIG. 1B     FIG. 1C
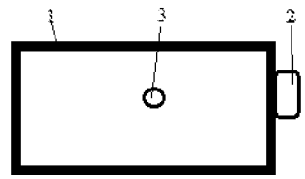
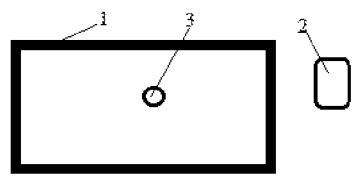
FIG. 2A     FIG. 2B
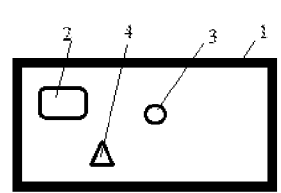
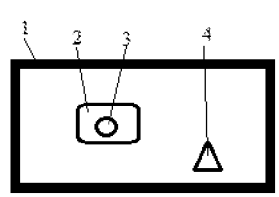
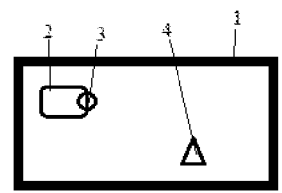
FIG. 3A     FIG. 3B     FIG. 3C
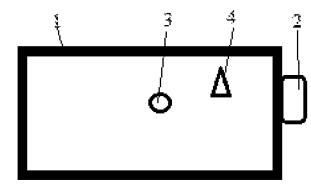
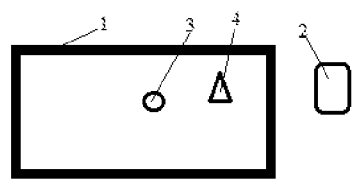
FIG. 4A     FIG. 4B

MOTOR VEHICLE SAFE DRIVING AND OPERATING DEVICES, MECHANISMS, SYSTEMS, AND METHODS

FIELD

This disclosure generally relates to a safe driving system for motor vehicles with the ability to prevent the hands-on use of portable electrical devices by the driver or operator of a motor vehicle while driving or operating a motor vehicle.

BACKGROUND

For as long as people have been driving motor vehicles, their ability to remain focused has been tested. Since the advent of "smart" mobile devices and other devices that allow for instant communication, active directions/mapping of a route(s), etc., there are more ways for a driver of a motor vehicle to become distracted, and terrible consequences may then occur.

Further, mobile phones have become virtually attached to every person. There is a Pavlov-type reaction to an alert sound from a mobile phone indicating an update of sorts has been received, there is new instant message, new text message, new email, new phone call, or other new message or communication, which causes an immediate reaction and desire to read and/or see what has arrived on the mobile device. When a person is driving or operating a motor vehicle, this type of reaction may cause the operator to become distracted for at best an instant, at worst seconds, all of which can be deadly.

SUMMARY

For the purpose of clarification, the described motor vehicle safe driving devices, mechanisms, systems, and methods, and all hardware, components, software, software applications, housings, any and all related products, features, and items, will herein be referred to as the Motor Vehicle Safety Device (MVSD).

For further clarification, mobile phones, mobile electronic devices, electronic tablet devices, computers, electronic devices, and other devices will herein be referred to as mobile electronic devices.

For further clarification, an automobile of any kind; a truck of any kind; any kind of motorized vehicle including an airplane, train, tram, light rail, trolley, and all other motorized vehicles; any structure or vehicle that is motorized or can be motorized; any electric powered vehicle or structure that can be mobilized; any transportation structure or vehicle; and any vehicle or structure that can be powered by and/or propelled by currently invented and to be invented in the future and their systems, mechanisms and means; will herein be referred to as a motor vehicle.

For further clarification, the words "and", "or", and "and/or" can be used separate, together, or be interchangeable. For further clarification, the words "can" and "may" can be used separate, together, or be interchangeable.

For further clarification, the words "in" and "on" can be used separate, together, or be interchangeable. For further clarification, the words or terms "driver" and "operator" can be used separate, together, or be interchangeable.

A motor vehicle safety device (MVSD) is described that may use sensors, software, and hardware to interact with one or more mobile electronic devices and the transmission mechanisms of a motor vehicle to prevent the engagement of the motor vehicle transmission mechanisms while the driver of the motor vehicle is using, is in physical contact with, is in close proximity to, or in visual contact with one or more mobile electronic devices that are in a powered "on" state. The ability of the MVSD's aforementioned interactions, and interactions described herein, can prevent a driver of a motor vehicle from the physical and visual distraction of one or more mobile electronic devices while driving a motor vehicle; prevent hands-on texting, emailing, messaging, and other uses of a mobile electronic device; and limit the driver's use of one or mobile electronic devices to audible and/or voice commands and/or audible interaction, thereby reducing the distraction while driving a motor vehicle.

Because there may be one or more passengers in a motor vehicle, the MVSD can use sensors, software, and hardware to interact with one or more mobile electronic devices of the one or more passengers in a motor vehicle. The interaction, and interactions described herein, can prevent the one or more passengers from showing a display screen of one or more mobile electronic devices to the driver of the motor vehicle, and may limit the usage and/or location the one or more passengers' mobile electronic devices to prevent the distraction of the driver of the motor vehicle.

The described MVSD can communicate with, interact with, and/or control, permit and/or restrict certain functions of mobile electronic devices.

The described MVSD can communicate with, interact with, and/or control, permit and/or restrict certain functions of motor vehicles.

The described MVSD can communicate with, interact with, and/or control, permit and/or restrict certain functions other MVSDs in a motor vehicle.

The described MVSD can change the way a driver of a motor vehicle receives, transcribes and/or composes, and sends text messages, emails, instant messages, and other correspondence, and/or other uses of one or more mobile electronic devices while operating a motor vehicle.

The described MVSD can change the way one or more passengers of a motor vehicle receives, transcribes and/or composes, and sends text messages, emails, instant messages, and other correspondence, and/or other uses of one or more mobile electronic devices while in a motor vehicle.

In another embodiment, the described MVSD can prevent a motor vehicle from engaging its reverse or forward drive transmission mechanisms while a mobile electronic device is powered 'on' and in a motor vehicle.

In an embodiment, the described MVSD can communicate with one or more mobile electronic devices using wired and/or wireless communication systems and technology, using proprietary communication technology, Bluetooth technology, and/or any other wireless technology, and/or any other communication technology, wired or wireless, currently invented or to be invented in the future.

In another embodiment, the described MVSD can have a housing that can be placed in a location in a motor vehicle to hold and store one or more mobile electronic devices. When one or more mobile electronic devices are placed in the MVSD, the location of the one or more mobile electronic devices is deemed secure.

In another embodiment, the described MVSD can have and/or can include a housing to be placed in a location in a motor vehicle to hold and store one or more mobile electronic devices. When one or more mobile electronic devices are placed in the MVSD, the location of the one or more mobile electronic devices is deemed secure.

In another embodiment, the described MVSD can have a housing built-in to a location in a motor vehicle to hold and store one or more mobile electronic devices. When one or more mobile electronic devices are placed in the MVSD, the location of the one or more mobile electronic devices is deemed secure.

In another embodiment, the described MVSD can have a housing placed in a location in a motor vehicle to hold and store one or more mobile electronic devices. When one or more mobile electronic devices are placed in the MVSD, the location of the one or more mobile electronic devices is deemed secure.

In another embodiment, the described MVSD can have a housing that can be attached to a location in a motor vehicle to hold and store one or more mobile electronic devices. When one or more mobile electronic devices are placed in the MVSD, the location of the one or more mobile electronic devices is deemed secure.

In another embodiment, the described MVSD can have a housing that is removably attachable to a location in a motor vehicle to hold and store one or more mobile electronic devices. When one or more mobile electronic devices are placed in the MVSD, the location of the one or more mobile electronic devices is deemed secure.

For clarification purposes, the terms "secure" and "secure location" can mean a location that prevents the driver of a motor vehicle from physically accessing any mobile electronic device in a motor vehicle; a location that prevents the driver of a motor vehicle from visually accessing or viewing the display screen of any mobile electronic device in a motor vehicle; a location that prevents the driver of a motor vehicle from physically and visually interacting with any mobile electronic device in a motor vehicle; and a location being in a MVSD.

In another embodiment, the described MVSD can have one or more sensors located in a motor vehicle. The one or more sensors can be in any location in a motor vehicle, and can communicate and interact wired and/or wirelessly with one or more MVSD in the motor vehicle; with one or more mobile electronic devices in a motor vehicle; with the motor vehicle's electrical system; mechanical systems; the motor vehicle's transmission, as well as software and programs of the MVSD, the motor vehicle, and all mobile electronic devices in the motor vehicle. The aforementioned can be in any and all combinations and variations, and in any order or sequence.

In another embodiment, the described MVSD can have one or more sensors located within the driver's seat of a motor vehicle that can sense when a person is sitting or seated on the seat and can sense if the person has one or more mobile electronic devices with them or on their person and if the one more mobile electronic devices are powered "on". The sensors can communicate and can interact with a MVSD in the motor vehicle informing the MVSD that a person is sitting on the driver's seat. The MVSD can communicate and can interact with the one or more mobile electronic devices; can identify the locations of each of the one or more mobile electronic devices and their respective power status (on or off); can communicate and interact with the motor vehicle's software and/or programs, other components and systems; can communicate and interact with the motor vehicle's transmission and can restrict the transmission from engaging its reverse or forward drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The aforementioned can be in any and all combinations and variations, and in any order or sequence.

In another embodiment, the described MVSD can have one or more sensors located within or placed on to a pad, cushion, or other seat cover that can be placed on top of the driver's seat of a motor vehicle. The one or more sensors can identify the location of the pad, cushion, or other seat cover as on the driver's seat. The one or more sensors can sense when a person is sitting or seated on the pad, cushion, or other seat cover, and the one or more sensors can sense if the person seated on the pad, cushion or other seat cover on the driver's seat has one or more mobile electronic devices with them and if the one or more mobile electronic devices are powered "on". The sensors can communicate and can interact with a MVSD in the motor vehicle informing the MVSD that a person is sitting on the driver's seat. The MVSD can communicate and can interact with the one or more mobile electronic devices; can identify the locations of each of the one or more mobile electronic devices and their respective power status (on or off); can communicate and interact with the motor vehicle's software and/or programs, other components and systems; can communicate and interact with the motor vehicle's transmission and can restrict the transmission from engaging its reverse and/or forward drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The sensors in the pad can be used to identify that one or more mobile electronic devices are present within the motor vehicle, and the proximity of the one or more mobile electronic devices to the nearest seat in the motor vehicle. The aforementioned can be in any and all combinations and variations, and in any order or sequence.

In another embodiment, the described MVSD can have one or more sensors that can be placed onto the driver's seat of a motor vehicle that can sense when a person is sitting or seated on the seat and can sense if the person has one or more mobile electronic devices with them and if the one more mobile electronic devices are powered "on". The sensors can communicate and can interact with a MVSD in the motor vehicle informing the MVSD that a person is sitting on the driver's seat. The MVSD can communicate and can interact with the one or more mobile electronic devices; can identify the locations of each of the one or more mobile electronic devices and their respective power status (on or off); can communicate and interact with the motor vehicle's software and/or programs, other components and systems; can communicate and interact with the motor vehicle's transmission and can restrict the transmission from engaging its reverse or forward drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The aforementioned can be in any and all combinations and variations, and in any order or sequence.

In another embodiment, the described MVSD can have one or more sensors, described previously and herein, that can be used separately and/or in any combination; can be located on, on top, under, within and/or in the driver's seat of a motor vehicle; and can sense when a person is sitting or is seated on the driver's seat of a motor vehicle. The sensors can be used to identify if one or more mobile electronic devices are present within the motor vehicle, the location of each of the one or more mobile electronic devices in the motor vehicle, and the proximity of each of the one or more mobile electronic devices to the nearest seat of the motor vehicle.

In another embodiment, the described MVSD can have one or more sensors located within the front passenger's seat of a motor vehicle that can sense when a person is sitting or seated on the seat, and can sense if the person has one or more mobile electronic devices with them and if the one more mobile electronic devices are powered "on". The sensors can communicate and can interact with a MVSD in the motor vehicle informing the MVSD that a person is sitting or seated on the front passenger's seat. The MVSD can communicate and can interact with the one or more mobile electronic devices and can identify the locations of each of the one or more mobile electronic devices and their respective power status (on or off). The MVSD and the one or more MVSD sensors can communicate and interact to identify if the passenger's one or more mobile electronic devices are powered "on" and in a location or proximity too close to the driver of the motor vehicle, and if too close, the MVSD can communicate and interact with the motor vehicle's software and/or programs, components and systems; can communicate and interact with the motor vehicle's transmission and can restrict the transmission from engaging its reverse or forward drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The aforementioned can be in any and all combinations and variations, and in any order or sequence. The sensors can be used to identify that one or more mobile electronic devices are present within the motor vehicle, and the one or more mobile electronic devices proximity to the nearest seat of the motor vehicle. Further, the MVSD sensors and the MVSD can monitor the direction of the display screen of the passenger's one or more mobile electronic devices, and if the display screen turns toward or in the direction of the driver, the MVSD can render the display screen black, can power-off the one or more mobile electronic devices, and other restrictive protocols. And if this happens more than once, the MVSD may power-off and/or disable the one or more mobile electronic devices until the motor vehicle has stopped and the transmission mechanism is in the park, the motor vehicle is parked.

In another embodiment, the described MVSD can have one or more sensors located within or on a pad, cushion, or other seat cover that can be placed on top of the front passenger's seat of a motor vehicle. The one or more sensors can identify the location of the pad, cushion, or other seat cover as on the front passenger's seat. The one or more sensors can sense when a person is sitting or seated on the pad, cushion, or other seat cover, and the one or more sensors can sense if the person seated on the pad, cushion or other seat cover on the front passenger's seat has one or more mobile electronic devices with them and if the one or more mobile electronic devices are powered "on". The sensors can communicate and can interact with a MVSD in the motor vehicle informing the MVSD that a person is sitting or seated on the front passenger's seat. The MVSD can communicate and can interact with the one or more mobile electronic devices and can identify the locations of each of the one or more mobile electronic devices and their respective power status (on or off). The MVSD and the one or more MVSD sensors can communicate and interact to identify if the passenger's one or more mobile electronic devices are powered "on" and in a location or proximity too close to the driver of the motor vehicle, and if too close, the MVSD can communicate and interact with the motor vehicle's software and/or programs, components and systems; can communicate and interact with the motor vehicle's transmission and can restrict the transmission from engaging its reverse or drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The aforementioned can be in any and all combinations and variations, and in any order or sequence. The sensors can be used to identify that one or more mobile electronic devices are present within the motor vehicle, and the one or more mobile electronic devices proximity to the nearest seat of the motor vehicle. Further, the MVSD sensors and the MVSD can monitor the direction of the display screen of the passenger's one or more mobile electronic devices, and if the display screen turns toward or in the direction of the driver, the MVSD can render the display screen black, can power-off the one or more mobile electronic devices, and other restrictive protocols. And if this happens more than once, the MVSD may power-off and/or disable the one or more mobile electronic devices until the motor vehicle has stopped and the transmission mechanism is in the park, the motor vehicle is parked.

In another embodiment, the described MVSD can have one or more sensors that can be placed onto the front passenger's seat of a motor vehicle that can sense when a person is sitting or seated on the front passenger's seat and the one or more sensors can sense if the person seated on the front passenger's seat has one or more mobile electronic devices with them and if the one or more mobile electronic devices are powered "on". The sensors can communicate and can interact with a MVSD in the motor vehicle informing the MVSD that a person is sitting or seated on the front passenger's seat. The MVSD can communicate and can interact with the one or more mobile electronic devices and can identify the locations of each of the one or more mobile electronic devices and their respective power status (on or off). The MVSD and the one or more MVSD sensors can communicate and interact to identify if the passenger's one or more mobile electronic devices are powered "on" and in a location or proximity too close to the driver of the motor vehicle, and if too close, the MVSD can communicate and interact with the motor vehicle's software and/or programs, components and systems; can communicate and interact with the motor vehicle's transmission and can restrict the transmission from engaging its reverse or drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The aforementioned can be in any and all combinations and variations, and in any order or sequence. The sensors can be used to identify that one or more mobile electronic devices are present within the motor vehicle, and the one or more mobile electronic devices proximity to the nearest seat of the motor vehicle. Further, the MVSD sensors and the MVSD can monitor the direction of the display screen of the passenger's one or more mobile electronic devices, and if the display screen turns toward or in the direction of the driver, the MVSD can render the display screen black, can power-off the one or more mobile electronic devices, and other restrictive protocols. And if this happens more than once, the MVSD may power-off and/or disable the one or more mobile electronic devices until the motor vehicle has stopped and the transmission mechanism is in the park, the motor vehicle is parked.

In another embodiment, the described MVSD can have one or more sensors, described previously and herein, that can be used separately and/or in any combination; can be located on, on top, under, within and/or in the front passenger's seat of a motor vehicle that can sense that a person is sitting or seated on the seat of a motor vehicle. The sensors can be used to identify that one or more mobile electronic devices are present within the motor vehicle, the location of each of the one or more mobile electronic devices in the motor vehicle, and the proximity of each of the one or more mobile electronic devices to the nearest seat of the motor vehicle.

In another embodiment, the described MVSD can have one or more sensors located within one, all, or any combination of seats or seating areas other than the driver's and front passenger's seat of a motor vehicle that can sense when one or more people are sitting or seated on the one or more seats. The one or more sensors can sense if one more people are sitting or seated on the one or more other seats in the motor vehicle, and the one or more sensors can sense if the one or more people have one or more mobile electronic devices with them and if the one or more mobile electronic devices are powered "on". The one or more sensors can communicate and can interact with a MVSD in the motor vehicle informing the MVSD that one or more people are sitting or seated on a seat other than the driver's and front passenger's seat. The MVSD can communicate and can interact with the one or more mobile electronic devices and can identify the locations of each of the one or more mobile electronic devices and their respective power status (on or off). The MVSD and the one or more MVSD sensors can communicate and interact to identify if one or more the passengers' one or more mobile electronic devices are powered "on" and in a location or proximity too close to the driver of the motor vehicle, and if too close, the MVSD can communicate and interact with the motor vehicle's software and/or programs, components and systems; can communicate and interact with the motor vehicle's transmission and can restrict the transmission from engaging its reverse or forward drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The aforementioned can be in any and all combinations and variations, and in any order or sequence. The sensors can be used to identify that one or more mobile electronic devices are present within the motor vehicle, and the one or more mobile electronic devices proximity to the nearest seat of the motor vehicle. Further, the MVSD sensors and the MVSD can monitor the location of the one or more mobile electronic devices as to their proximity to the driver and if too close, the MVSD can render the display screen black, can power-off the one or more mobile electronic devices, and other restrictive protocols; can monitor the direction of the display screen of the passenger's one or more mobile electronic devices, and if the display screen turns toward or in the direction of the driver, the MVSD can render the display screen black, can power-off the one or more mobile electronic devices, and other restrictive protocols. And if either of the aforementioned happens more than once, the MVSD may power-off and/or disable the one or more mobile electronic devices until the motor vehicle has stopped and the transmission mechanism is in the park, the motor vehicle is parked.

In another embodiment, the described MVSD can have one or more sensors located within or on one or more pads, cushions, or other seat covers that can be placed on top of one, all, or any combination of seats or seating areas other than the driver's and front passenger's seat of a motor vehicle. The one or more sensors can sense when one or more people are sitting or seated on the one or more pads, cushions, or other seat covers other than the driver's and front passenger's seat of a motor vehicle. The one or more sensors can sense if one more people are sitting or seated on the one or more other seats in the motor vehicle, and the one or more sensors can sense if the one or more people have one or more mobile electronic devices with them and if the one or more mobile electronic devices are powered "on". The one or more sensors can communicate and can interact with a MVSD in the motor vehicle informing the MVSD that one or more people are sitting or seated on a seat other than the driver's and front passenger's seat. The MVSD can communicate and can interact with the one or more mobile electronic devices and can identify the locations of each of the one or more mobile electronic devices and their respective power status (on or off). The MVSD and the one or more MVSD sensors can communicate and interact to identify if one or more the passengers' one or more mobile electronic devices are powered "on" and in a location or proximity too close to the driver of the motor vehicle, and if too close, the MVSD can communicate and interact with the motor vehicle's software and/or programs, components and systems; can communicate and interact with the motor vehicle's transmission and can restrict the transmission from engaging its reverse or forward drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The aforementioned can be in any and all combinations and variations, and in any order or sequence. The sensors can be used to identify that one or more mobile electronic devices are present within the motor vehicle, and the one or more mobile electronic devices proximity to the nearest seat of the motor. Further, the MVSD sensors and the MVSD can monitor the location of the one or more mobile electronic devices as to their proximity to the driver and if too close, the MVSD can render the display screen black, can power-off the one or more mobile electronic devices, and other restrictive protocols; can monitor the direction of the display screen of the passenger's one or more mobile electronic devices, and if the display screen turns toward or in the direction of the driver, the MVSD can render the display screen black, can power-off the one or more mobile electronic devices, and other restrictive protocols. And if either of the aforementioned happens more than once, the MVSD may power-off and/or disable the one or more mobile electronic devices until the motor vehicle has stopped and the transmission mechanism is in the park, the motor vehicle is parked.

In another embodiment, the described MVSD can have one or more sensors that can be placed onto one, all, or any combination of seats or seating areas other than the driver's and front passenger's seat of a motor vehicle that can sense when one or more people are sitting or seated on the one or more seats. The one or more sensors can sense if one more people are sitting or seated on the one or more other seats in the motor vehicle, and the one or more sensors can sense if the one or more people have one or more mobile electronic devices with them and if the one or more mobile electronic devices are powered "on". The one or more sensors can communicate and can interact with a MVSD in the motor vehicle informing the MVSD that one or more people are sitting or seated on a seat other than the driver's and front passenger's seat. The MVSD can communicate and can interact with the one or more mobile electronic devices and can identify the locations of each of the one or more mobile electronic devices and their respective power status (on or off). The MVSD and the one or more MVSD sensors can communicate and interact to identify if one or more the passengers' one or more mobile electronic devices are powered "on" and in a location or proximity too close to the driver of the motor vehicle, and if too close, the MVSD can communicate and interact with the motor vehicle's software and/or programs, components and systems; can communicate and interact with the motor vehicle's transmission and can restrict the transmission from engaging its reverse or forward drive mechanisms; and can communicate and interact with the motor vehicle's ignition system, allowing the motor vehicle to be turned "on", "started" and/or powered "on", or remain "off" and prevent the motor vehicle from turning "on", "starting" and/or powering "on", depending on the settings of the MVSD. The aforementioned can be in any and all combinations and variations, and in any order or sequence. The sensors can be used to identify that one or more mobile electronic devices are present within the motor vehicle, and the one or more mobile electronic devices proximity to the nearest seat of the motor vehicle. Further, the MVSD sensors and the MVSD can monitor the location of the one or more mobile electronic devices as to their proximity to the driver and if too close, the MVSD can render the display screen black, can power-off the one or more mobile electronic devices, and other restrictive protocols; can monitor the direction of the display screen of the passenger's one or more mobile electronic devices, and if the display screen turns toward or in the direction of the driver, the MVSD can render the display screen black, can power-off the one or more mobile electronic devices, and other restrictive protocols. And if either of the aforementioned happens more than once, the MVSD may power-off and/or disable the one or more mobile electronic devices until the motor vehicle has stopped and the transmission mechanism is in the park, the motor vehicle is parked.

In another embodiment, the described MVSD can have one or more sensors described previously and herein that can be used in any combination or alone and be located on, on top, under, within and/or in one, all, or any combination of seats or seating areas other than the driver's and front passenger's seat of a motor vehicle that can sense when one or more people are sitting or seated on a seat in the motor vehicle. The sensors can be used to identify that one or more mobile electronic devices are present within the motor vehicle, the location of each of the one or more mobile electronic devices in the motor vehicle, and the proximity of each of the one or more mobile electronic devices to the nearest seat of the motor vehicle. The sensors can identify that one or more mobile electronic devices are present within the motor vehicle and the proximity of the one or more mobile electronic devices to the nearest seat of the motor vehicle even when no person is seated on a seat in the motor vehicle.

In another embodiment, the described MVSD can have one or more sensors located in a motor vehicle, described herein, that can be used separately and/or in any combination to identify that one or more mobile electronic devices are present within the motor vehicle, the location of each of the one or more mobile electronic devices in the motor vehicle, and the proximity of each of the one or more mobile electronic devices to the nearest seat of the motor vehicle. A person can be standing and does not have to be seated on any seat in the motor vehicle, nor does a person have to be present in the motor vehicle for the sensors to sense and identify if one or more mobile electronic devices are in the motor vehicle. Further, the described MVSD performs as described herein whether a person is seated or not seated in the motor vehicle, and whether a person is present in the motor vehicle or not, thereby allowing full functionality when one or more mobile electronic devices are sensed in the motor vehicle.

In another embodiment, the described MVSD can have one or more sensors that can be in and/or on all doors of a motor vehicle. The sensors can be used to identify when one or more mobile electronic devices are in a motor vehicle, and the proximity of the one or more mobile electronic devices to the nearest door of the motor vehicle. The sensors can communicate and interact with one or more MVSDs in the motor vehicle, and the one or more mobile electronic devices. The one or more MVSD can communicate and interact with the one or more mobile electronic devices. Interactions, communications, and actions are as described herein and not limited to any examples given herein.

In another embodiment, the described MVSD can locate one or more mobile electronic devices within a motor vehicle, determine the proximity of each of the one or more located mobile electronic devices to one or more sensors, and have the ability to sense, know, and pinpoint the distance of the one or more mobile electronic devices from the one or more sensors. The one or more sensors may be in or on a door, and if the distance of the one or more mobile electronic devices move further than a preset distance, the one or more mobile electronic devices will be rendered inoperable.

For clarification purposes, the terms "useless", "inoperable", or any similar term, used throughout and herein can mean that the display screen of a mobile electronic device can be turned off and/or turned to black; can render a mobile electronic device's keyboard inoperable, thereby preventing its use; and can turn off a mobile electronic device; can make a mobile electronic device unusable.

In another embodiment, the described MVSD may have built-in data storage capacity to allow for the ability to store data in the MVSD. The data storage capability of the MVSD may utilize permanent memory or storage technology built-in to the MVSD. The MVSD may also or alternatively utilize removable memory and storage technology, thereby allowing the user to remove and replace memory and storage technology. The MVSD may utilize both permanent and removable memory technology separately or in any combination, currently invented or to be invented in the future.

In another embodiment, the described MVSD can have a programmable feature that allows a user to program and save music, email addresses, postal addresses, telephone numbers, and other data in to the memory of the MVSD.

In another embodiment, the described MVSD can control the usage and/or the usability of one or more mobile electronic devices within a motor vehicle.

In another embodiment, the described MVSD can sense/identify when one or more mobile electronic devices are powered 'on' and not in a secured location in a motor vehicle.

In another embodiment, if the motor vehicle is engaged in forward, drive or reverse, or theses transmissions are engaged, and/or the motor vehicle is moving, the described MVSD can sense when a mobile electronic device is powered 'on' and removed from a secure location, and will immediately render the mobile electronic device useless and/or unusable and/or turn the mobile electronic device's screen to black, and/or render the mobile electronic device's keyboard unusable, and/or turn the mobile electronic device's power off, and/or other functions to the mobile electronic device to prevent it from being used. The aforementioned are to illustrate a few possible examples that can be taken by the MVSD on one or more mobile electronic devices in a motor vehicle when the motor vehicle is moving, and the illustrative examples do not limit the described MVSD and all features and other aspects and components herein.

In another embodiment, the described MVSD can prevent a motor vehicle from engaging its reverse and/or forward drive transmission mechanisms when one or more mobile electronic devices are not in a secure location in a motor vehicle.

In another embodiment, the described MVSD can have one or more secured locations in a motor vehicle to place, hold and store one or more mobile electronic devices.

In another embodiment, the described MVSD can be a secure location in a motor vehicle to place, hold and store one or more mobile electronic devices, and one or more described MVSD can be in a motor vehicle.

In another embodiment, the described MVSD can be connected directly to a motor vehicle.

In another embodiment, the described MVSD can be hardwired connected to a motor vehicle.

In another embodiment, the described MVSD can be wirelessly connected to a motor vehicle.

In another embodiment, the described MVSD can be built-in to a motor vehicle; can be built-on to a motor vehicle; can be attached to a motor vehicle; can be removably attached to a motor vehicle; can be positioned/placed anywhere in a motor vehicle; and can be positioned/placed anywhere on a motor vehicle, and in any and all combinations and variations described herein.

In another embodiment, the described MVSD can be built-in to a motor vehicle during the manufacturing of a motor vehicle; can be built-in anywhere in the motor vehicle; and can be connected directly to a motor vehicle, in any and all combinations and variations described herein.

In another embodiment, the described MVSD can be built in to a motor vehicle after the manufacturing of a motor vehicle; can be built in anywhere in the motor vehicle; and can be connected directly to a motor vehicle, in any and all combinations and variations described herein.

In another embodiment, the described MVSD can have a program, software, mechanism, and/or system that works directly and/or indirectly with the transmission of a motor vehicle, in any and all combinations and variations described herein.

In another embodiment, there can be one or more of the described MVSD in a motor vehicle, in any and all combinations and variations described herein.

In another embodiment, there can be one or more of the described MVSD outside of a motor vehicle, in any and all combinations and variations described herein.

In another embodiment, there can be one or more of the described MVSD in a motor vehicle and one or more of the described MVSD outside a motor vehicle, in any and all combinations and variations described herein.

In another embodiment, the described MVSD can have one or more programs and/or software applications, security-type or other, that can prevent circumvention of the MVSD, its hardware components and features, and its software programs and features, in any and all combinations and variations described herein.

In another embodiment, if the described MVSD has an attempted unauthorized alteration to it, any motor vehicle in which the attempted unauthorized alteration of the MVSD is in will become undrivable, meaning the motor vehicle will be prevented from engaging its forward drive and/or reverse transmission mechanisms. An alert notification may be sent one or more authorities notifying them of the attempted unauthorized alteration. The MVSD can also notify one or more law enforcement authorities.

In another embodiment, if the described MVSD has an unauthorized alteration, any motor vehicle in which the unauthorized alteration of the MVSD is in will become undrivable, meaning the motor vehicle will be prevented from engaging its forward drive and/or reverse transmission mechanisms. An alert notification may be sent to one or more authorities notifying them of the unauthorized alteration. The MVSD can also notify one or more law enforcement authorities.

In another embodiment, if the described MVSD that is attached to, incorporated in, built-in to, or in a motor vehicle has an attempted and/or completed unauthorized alteration to it, the motor vehicle that has had an unauthorized alteration will become undrivable, meaning the motor vehicle will be prevented from engaging its forward drive or reverse transmission mechanisms. An alert notification may be sent to one or more authorities notifying them of the unauthorized alteration. The MVSD can also notify one or more law enforcement authorities.

In another embodiment, the described MVSD can have authorized and/or licensed mechanics, service departments, and other motor vehicle repair and sale dealerships who/that can be registered as such. There can be a requirement that any person who works on an MVSD must be authorized and/or licensed to make any and all alterations and/or modifications to an MVSD and its motor vehicle. Further, there can be one or more systems and/or mechanisms that monitors, records and saves the identity of any person who has worked on the motor vehicle, who has altered or modified, or attempted to alter or modify an MVSD and/or any aspect of an MVSD, and the motor vehicle it is associated with. If an unauthorized or unlicensed person alters and/or modifies, or attempts to alter and/or modify, an MVSD and/or a motor vehicle it is associated with, the motor vehicle can be rendered undrivable as mentioned herein. An alert notification may be sent to authorities notifying them of the unauthorized alteration. The MVSD can also notify one or more law enforcement authorities.

In another embodiment, the described MVSD can have an alert/safety system that can recognize authorized and/or licensed mechanics, service departments, and other motor vehicle repair and sale dealerships; can record and track any person(s) who works on the motor vehicle, who has attempted to and who has altered or modified an MVSD and/or any aspect of the MVSD and/or the motor vehicle. There can be a requirement that any person(s) who works on a motor vehicle with one or more MVSD, or one or more MVSD associated with the motor vehicle, must be authorized and/or licensed to make any and all alterations and/or modifications to the MVSD and/or any motor vehicle associated with the one or more MVSD. If an unauthorized or unlicensed person attempts to alter or modify, alters or modifies any MVSD and/or any motor vehicle associated with one or more MVSD, the motor vehicle can be rendered undrivable as previously mentioned. An alert notification may be sent to one or more authorities notifying them of the unauthorized alteration. The MVSD can also notify one or more law enforcement authorities.

In another embodiment, the described MVSD can have authorized and/or licensed software engineers, and other authorized and/or licensed persons who can be registered and may receive the authorization to modify or alter one or more MVSD software applications. There can be a requirement that any person who works on, attempts to modify or modifies, attempts to alter or alters one or more MVSD software applications, that person must be authorized and/or licensed to attempt or make any and all alterations and/or modifications to any MVSD, and any motor vehicle associated with an MVSD. If an unauthorized and/or unlicensed person alters and/or modifies, or attempts to, any MVSD and/or any motor vehicle associated with one or more MVSD, the motor vehicle can be rendered undrivable as previously mentioned. An alert notification may be sent to one or more authorities notifying them of the unauthorized alteration. The MVSD can also notify one or more law enforcement authorities.

In another embodiment, the described MVSD can have an alert/safety system that can recognize authorized and/or licensed software engineers, and/or other authorized and/or licensed persons who can be registered and may receive authorization to modify or alter one or more MVSD software applications. There can be a requirement that any person working on, modifying, altering any and all MVSD software applications must be authorized and/or licensed to make any and all alterations and/or modifications to any MVSD, and any motor vehicle associated with an MVSD. If an unauthorized, unlicensed, and/or unregistered person alters and/or modifies, or attempts to, any MVSD and/or any motor vehicle associated with an MVSD, the motor vehicle can be rendered undrivable as previously mentioned. An alert notification may be sent to one or more authorities notifying them of the unauthorized alteration. The MVSD can also notify one or more law enforcement authorities.

In another embodiment, the described MVSD can have authorized and/or licensed software engineers, and other authorized and/or licensed persons who can be registered and may receive the authorization to modify or alter one or more MVSD mobile electronic device software applications and/or hardware. There can be a requirement that any person who works on, attempts to modify or modifies, attempts to alter or alters one or more MVSD mobile electronic software applications and/or hardware, that person must be authorized and/or licensed to attempt or make any and all alterations and/or modifications to any MVSD mobile electronic software application and/or hardware, and any motor vehicle associated with an MVSD mobile electronic software application and/or hardware. If an unauthorized and/or unlicensed person alters and/or modifies, or attempts to, any MVSD mobile electronic software application and/or hardware, and/or any motor vehicle associated with one or more MVSD mobile electronic devices, the motor vehicle can be rendered undrivable as previously mentioned. An alert notification may be sent to one or more authorities notifying them of the unauthorized alteration. The MVSD can also notify one or more law enforcement authorities.

In another embodiment, the described MVSD can have an alert/safety system that can recognize authorized and/or licensed software engineers who can be registered, and/or other authorized and/or licensed persons who can be registered and may receive authorization to modify or alter one or more MVSD mobile electronic device software applications and/or hardware. There can be a requirement that any person working on, modifying, and/or altering any and all MVSD mobile electronic device software applications and/or hardware must be authorized and/or licensed and can be registered to make any and all alterations and/or modifications to any MVSD mobile electronic device software application and/or hardware, and any motor vehicle associated with an MVSD. If an unauthorized, unlicensed, and/or unregistered person alters and/or modifies, or attempts to, any MVSD mobile electronic device software application and/or hardware, and/or any motor vehicle associated with an MVSD mobile electronic device, the motor vehicle can be rendered undrivable as previously mentioned. An alert notification may be sent to one or more authorities notifying them of the unauthorized alteration. The MVSD can also notify one or more law enforcement authorities.

In another embodiment, the described MVSD can notify one or more authorities if an alteration or modification is attempted and/or completed on the MVSD, its software applications, its hardware, mechanisms, and/or any component; any motor vehicle MVSD software, hardware, components; any mobile electronic device MVSD software application and/or hardware; and/or any aspect of any MVSD and any related MVSD components, software, hardware, or any aspect that can be related to the described MVSD herein. Further, the one or more notified authorities can be a parent, legal guardian, or any designated person, as well as any state representative, and/or any person so designated by the local, state, federal governments, thereby making any and all persons with a mobile electronic device and/or a motor vehicle responsible and liable for any attempted or completed alteration/modification of any aspect to any MVSD and any/all of its associated components, devices, software applications, hardware and any described and/or inferred embodiment herein. The MVSD can also notify one or more law enforcement authorities.

In another embodiment, the described MVSD can allow a parent, guardian, or other person to monitor, and check-in with a MVSD in a motor vehicle to monitor usage of any mobile electronic device in the motor vehicle. Further, the described MVSD can notify a parent(s), guardian(s) or other person(s) if there is an attempt to access and/or use of the mobile electronic device associated with the driver of the motor vehicle while the motor vehicle is moving. The MVSD can also notify one or more law enforcement authorities.

In another embodiment, the described MVSD can have one or more wireless communication devices, systems, and technologies to provide hands-free communication with one or more mobile electronic devices within a motor vehicle. The one or more wireless communication devices, systems, and technologies can be proprietary, and/or can be any existing or to be invented wireless communication system in the future. The wireless communication can provide audible interaction with one or more mobile electronic devices in a motor vehicle with the described MVSD.

In another embodiment, the described MVSD can be one or more wireless communication devices, mechanisms, systems, and technologies to provide a hands-free communication system to interact with one or more mobile electronic devices within a motor vehicle. The wireless communication can be audible interaction with one or more mobile electronic devices in a motor vehicle with the described MVSD.

In another embodiment, the described MVSD can be a hardware component that can be placed into and/or connected to a mobile electronic device. The hardware component can be built-in to a mobile electronic device. The hardware component can be used for communication between a mobile electronic device and one or more MVSD; can be a security mechanism that can detect when the mobile electronic device is not in a secure location, as described herein; can be for any described feature, aspect and/or use as described herein. Further, there can be a security system that can detect if the MVSD hardware has been disabled, removed, altered, or any attempt of the aforementioned, which could then immediately disable the mobile electronic device, render the associated motor vehicle undrivable, and/or render a motor vehicle undrivable where the mobile electronic device is located. There can also be an alert system and notifications, as described herein.

In another embodiment, the described MVSD can have a security feature that allows one or more mobile electronic devices to be programmed in to the MVSD and designated as "driver" mobile electronic devices, thereby preventing the motor vehicle from being started and/or driven if one of the one or more "driver" mobile electronic devices is not present in the motor vehicle. The MVSD can have all the necessary components that allow the security feature to fully function. The term "driver" is an example a term that can be used and does not limit the described MVSD to the example. This feature can prevent a motor vehicle from being started or powered-on without the presence of the one or more designated mobile electronic devices.

In another embodiment, the described MVSD can have a security feature that can detect when a motor vehicle is started, turned on or powered on by improper or abnormal methods and/or by improper or abnormal means, and then the MVSD can immediately make the motor vehicle undrivable by preventing the motor vehicle's transmission from engaging; the MVSD can immediately power off or turn off the motor vehicle's power, thereby making the motor vehicle undrivable; and the MVSD can immediately notify the motor vehicle's owner as well as police and other authorities, of the attempted theft.

In another embodiment, the described MVSD can have a security feature that can detect when a motor vehicle's window is broken, a door is opened without a key or by other proper method or means, and then the MVSD can immediately make the motor vehicle undrivable by preventing the motor vehicle's transmission from engaging; the MVSD can immediately power off or turn off the motor vehicle's power, thereby making the motor vehicle undrivable; and the MVSD can immediately notify the motor vehicle's owner as well as police and other authorities, of the attempted theft.

In another embodiment, the described MVSD can have one or more applications or software applications for mobile electronic devices that can automatically communicate and interact with one or more MVSD when in a motor vehicle.

In another embodiment, the described MVSD can have one or more applications or software applications for mobile electronic devices that can automatically communicate and interact with one or more MVSD when the one or more mobile electronic devices are in proximity to the one or more MVSD, when either one or both of the aforementioned is outside a motor vehicle.

In another embodiment, the described MVSD can have an application or software application that can recognize and identify when one or more mobile electronic devices are within a motor vehicle, and the location of each of the one or more mobile electronic devices while in a motor vehicle.

In another embodiment, the described MVSD can have an application or software application that can recognize and identify when one or more mobile electronic devices are in proximity to a motor vehicle, and the location of each of the one or more mobile electronic devices while in a motor vehicle or outside in proximity to a motor vehicle.

In another embodiment, the described MVSD can have mobile electronic device software and software applications that are programmed to interact with one or more MVSD in one or more specific motor vehicles that the owner or user of the mobile electronic device drives or operates. The driver of one or more motor vehicles can have one or more mobile electronic devices that can be recognized, associated with, and interact with the MVSD in a motor vehicle they are driving, and all restrictions, applications, and embodiments mentioned herein can be available and activated.

In another embodiment, the described MVSD can have one or more software applications that can be programmed and/or setup to correspond and interact directly with a specific motor vehicle, or more than one motor vehicle, thereby providing access and the ability to interact with the MVSD in each of the one or more motor vehicles a person may drive. And further, if the described MVSD is not present in the motor vehicle it corresponds and interacts with, the said motor vehicle can be inoperable, meaning it cannot be driven. A MVSD must be present in a motor vehicle for the motor vehicle to operate, function, and be drivable.

In another embodiment, motor vehicles cannot drive or engage their forward and reverse transmission mechanisms when there is not a MVSD present in the motor vehicle, and a MVSD must be connected to the motor vehicle, either wired or wireless, and a MVSD must be fully functional, as described herein. Further, this shall include all motor vehicles.

In another embodiment, the described MVSD can have mobile electronic device software and software applications that are programmed to interact with one or more MVSD in one or more motor vehicles. One or more passengers in a motor vehicle can have one or more mobile electronic devices that can be recognized, associated with, and interact with the motor vehicle in which they are a passenger, and all restrictions, applications, and embodiments mentioned herein can be available and activated.

In another embodiment, the described MVSD can have a program and/or software application that allows the MVSD to interact and communicate with and play music from one or more mobile electronic devices within a motor vehicle, through wired and/or wireless connectivity.

In another embodiment, the described MVSD can communicate and interact with one or more mobile electronic devices within a motor vehicle to allow the one or more mobile electronic devices to select and play music from the one or more mobile electronic devices through the motor vehicle's audio and/or stereo system, and can be done so through wired or wireless connectivity.

In another embodiment, the described MVSD can have voice-activation software applications and software programs, invented or to be invented in the future, and can use the voice-activation software application and software programs to perform any and all actions, functions, and embodiments described herein.

In another embodiment, the described MVSD can be programmed to only respond to one specific voice, thereby the MVSD voice activation can be only be used by the voice of the person programmed in to the MVSD. The described MVSD can perform requested actions which are given verbally and/or audibly by the specified person in a motor vehicle. A password or security code or similar can be used to access the motor vehicle and MVSD.

In another embodiment, the described MVSD can be programmed to only respond to one or more specific voices, thereby the MVSD voice activation can be only be used by the voice of the one or more persons programmed in to the MVSD. The described MVSD can perform requested actions which are given verbally and/or audibly by the one or more specified persons in a motor vehicle.

In another embodiment, the described MVSD can acknowledge, respond to, perform, and/or interact to one or more voice commands from one or more persons in a motor vehicle. The MVSD can perform the requested actions given verbally and/or audibly by one or more persons in a motor vehicle.

In another embodiment, the described MVSD can acknowledge, respond to, perform, and/or interact with voice activated commands to play music, change song selections, play music playlists, and other commands to use the music and audio files of one or more mobile electronic devices within a motor vehicle, and broadcast the music through the motor vehicle's speakers and/or the MVSD audio speakers.

In another embodiment, the described MVSD can have software and/or software applications that can make the driver of the motor vehicle's one or more mobile electronic devices' display screen turn black or turn off; make the keyboard, hardware, software, and other active applications of the one or more mobile electronic devices useless and/or unusable when the motor vehicle's transmission is engaged in drive or reverse, or the motor vehicle is moving.

In another embodiment, the described MVSD can use its own wireless communication systems and/or programs or can use other wireless communication systems and/or programs, as a non-limiting example: Blue Tooth, to communicate and interact with text messaging programs and/or applications, email programs and/or applications, instant messaging programs and/or applications, and all other communicative programs and/or applications of one or more mobile electronic devices within a motor vehicle, separately and in any combination thereof.

In another embodiment, the described MVSD can have software and/or software applications that can use its own wireless communication systems and/or programs or can use other wireless communication systems and/or programs, as a non-limiting example: Blue Tooth, to communicate and interact with text messaging programs and/or applications, email programs and/or applications, instant messaging programs and/or applications, and all other communicative programs and/or applications of one or more mobile electronic devices within a motor vehicle, separately and in any combination thereof.

In another embodiment, the described MVSD can have wireless audio communication software, applications, programs, and/or systems, separately and in any and all combinations, that can interact with text messaging programs and/or applications, email programs and/or applications, instant messaging programs and/or applications, and all other communicative programs and/or applications, invented or to be invented, of one or more mobile electronic devices within a motor vehicle, separately and in any combination thereof.

In another embodiment, the described MVSD can use wireless audio communication software, applications, programs, and/or systems, separately and in any and all combinations, that can interact with text messaging programs and/or applications, email programs and/or applications, instant messaging programs and/or applications, and all other communicative programs and/or applications, invented or to be invented, of one or more mobile electronic devices within a motor vehicle, separately and in any combination thereof.

In another embodiment, the described MVSD can use a motor vehicle's audio speaker system.

In another embodiment, the described MVSD can have one or more speakers built into a MVSD; built onto a MVSD; added to a MVSD; connected via wire(s) to a MVSD; connected via wireless technology; and the aforementioned connections can be separately and in any combination thereof. Further, the one or more speakers can be placed in any location within a motor vehicle, and/or if desired outside a motor vehicle.

In another embodiment, the described MVSD can have features, mechanisms, functions, and all necessary components that provide for the programmability of the MVSD to be set up and customized for each user of the MVSD. An example of one customization is the ability for a user to set the MVSD to audibly announce the reception of email, the name of the sender of the received email, and audibly read aloud the received email through one or more audio speakers described herein. The aforementioned example is given to illustrative one of the many embodiments of the described MVSD and in no way limits the MVSD to the example.

In another embodiment, the described MVSD can have the necessary components to audibly announce the reception of email, text messages, instant messages, voice messages/mail, and all other communications, through one or more audio speakers described herein; to audibly announce who the sender of the email, text messages, instant messages, voice messages/mail, and all other communications, through one or more audio speakers described herein; to audibly read aloud email, text messages, instant messages, voice messages/mail, and all communications, through one or more audio speakers described herein.

In another embodiment, the described MVSD can announce the reception of email, text messages, instant messages, voice messages/mail, and all other communications, through one or more audio speakers described herein; audibly announce who the sender of the received email, text messages, instant messages, voice messages/mail, and all other received communications, through one or more audio speakers described herein; audibly read aloud email, text messages, instant messages, voice messages/mail, and all communications, through one or more audio speakers described herein.

In another embodiment, the described MVSD can have an internal/built-in MVSD sensor that can identify when one or more mobile electronic devices are in a motor vehicle.

In another embodiment, the described MVSD can have a MVSD sensor that can identify when one or more mobile electronic devices are in a motor vehicle.

In another embodiment, the described MVSD can have the necessary components, software, technology, and/or programs, to recognize when one or more mobile electronic devices are in a motor vehicle.

In another embodiment, the described MVSD can automatically interact with a motor vehicle's transmission mechanisms and systems. When one or more mobile electronic devices are powered on and in a motor vehicle, the MVSD can prevent the motor vehicle's transmission from engaging its drive and/or reverse mechanisms until all the one or more mobile electronic devices in the vicinity of the driver or associated with the driver of the motor vehicle, as described herein, are either placed in a MVSD; placed in a secure location, as described herein; or powered off. When a MVSD can verify that the one more mobile electronic devices are powered off; not in the vicinity of the driver of the motor vehicle to prevent the driver from handling, looking at, or otherwise physically interacting with the one or more mobile electronic devices; placed in a secure location, as described herein; placed in a MVSD, then the MVSD will allow the motor vehicle transmission to engage its forward drive and reverse mechanisms, thereby allowing the motor vehicle to be driven.

In another embodiment, the described MVSD can have a MVSD sensor that can identify when a mobile electronic device is in a motor vehicle and can automatically interact with the motor vehicle's transmission mechanism, In another embodiment, the described MVSD can interact with one or more mobile electronic devices in a motor vehicle.

In another embodiment, the described MVSD can interact with one or more mobile electronic devices' communication software, communication hardware, communication software application, and/or in any combination, while the one or more mobile electronic devices are in a motor vehicle.

In another embodiment, the described MVSD can notify the driver of the motor vehicle when one or more text messages are received by their one or more mobile electronic devices. The notification can be a sound, an audible voice, and/or any other type of notification to inform the driver.

In another embodiment, the described MVSD can audibly read one or more text messages received by one or more mobile electronic devices in a motor vehicle, through the audio system and speakers of the motor vehicle, through the speakers of the one or more mobile electronic devices, and/or through the speakers of the described MVSD device, singularly or in any combination thereof.

In another embodiment, the described MVSD can notify the driver of the motor vehicle when one or more email messages are received by and/or to their one or more mobile electronic devices. The notification can be a sound, an audible voice, and/or any other type of notification to inform the driver.

In another embodiment, the described MVSD can audibly read one or more email messages received by one or more mobile electronic devices in a motor vehicle, through the audio system and speakers of the motor vehicle, through the speakers of the one or more mobile electronic devices, and/or through the speakers of the described MVSD device, singularly or in any combination thereof.

In another embodiment, the described MVSD can notify the driver of the motor vehicle when one or more instant messages or any type of messages are received by and/or to their one or more mobile electronic devices. The notification can be a sound, an audible voice, and/or any other type of notification to inform the driver.

In another embodiment, the described MVSD can audibly read one or more instant messages or any type of messages received by one or more mobile electronic devices in a motor vehicle, through the audio system and speakers of the motor vehicle, through the speakers of the one or more mobile electronic devices, and/or through the speakers of the described MVSD device, singularly or in any combination thereof.

In another embodiment, the described MVSD can understand verbal or voice commands spoken by a person or persons in a motor vehicle, and the described MVSD can audibly reply to questions and commands verbally/spoken by a person or persons in a motor vehicle.

In another embodiment, when a text message, email message, instant message or any other message is received by one or more mobile electronic devices in a motor vehicle, the described MVSD can audibly ask the recipient if the received message should be read aloud. If the person responds "yes" or another affirmative response, the described MVSD will audibly read the message aloud. If the person responds "no" or another non-affirmative response, the described MVSD can audibly ask if a preset response message should be sent, in the same message format as received or in another message format. The described MVSD can audibly respond to and interact with questions and commands verbally given to the MVSD, wherein a response by the MVSD can be to perform actions. Examples of such actions could be to read a text message; could be to read an email; could be to construct/write a text message and send it; could be to construct/write an email message and send it. The aforementioned examples are to illustrate a small sample of actions that can be performed by a MVSD and do not limit or restrict the MVSD to the examples given.

In another embodiment, the described MVSD can verbally and/or audibly interact with one or more persons in a motor vehicle.

In another embodiment, the described MVSD can have preprogrammed, programmed, and programmable verbal/audible commands, requests, responses, and other interactional items and features, providing the MVSD the ability to interact with one or more persons in a motor vehicle.

In another embodiment, the described MVSD can be programmable with custom verbal/audible commands, requests, responses, and other interactional items, to interact with a person in a motor vehicle, and programmable custom responses to the received messages, described herein.

In another embodiment, the described MVSD can have preprogrammed text messages saved in its memory that can be used to reply to text messages received by a mobile electronic device. Further, the described MVSD can have preprogrammed text messages saved in its memory that can be used to send text messages from a mobile electronic device in the motor vehicle. A preprogrammed text message can be sent by verbally/audibly commanding the MVSD to send the desired preprogrammed text message to any person when instructed to do so.

In another embodiment, the described MVSD can be programmable to program and save text messages in to the memory of a MVSD, thereby allowing for customized saved text messages that can be used later. The programmed text messages can be used to reply to text messages received by a mobile electronic device, and/or can be used to send a text message. A programmed text message can be sent by verbally/audibly commanding the MVSD to send the desired programmed text message to any person when instructed to do so.

In another embodiment, the described MVSD can have preprogrammed email messages saved in its memory that can be used to reply to email messages received by a mobile electronic device. Further, the described MVSD can have preprogrammed email messages saved in its memory that can be used to send email messages from a mobile electronic device in the motor vehicle. A preprogrammed email message can be sent by verbally/audibly commanding the MVSD to send the desired preprogrammed email message to any person when instructed to do so.

In another embodiment, the described MVSD can be programmable to program and save email messages in to the memory of a MVSD, thereby allowing for customized saved email messages that can be used later. The programmed email messages can be used to reply to email messages received by a mobile electronic device, and/or can be used to send an email message. A programmed email message can be sent by verbally/audibly commanding the MVSD to send the desired programmed email message to any person when instructed to do so.

In another embodiment, the described MVSD can have preprogrammed instant messages saved in its memory that can be used to reply to instant messages received by a mobile electronic device. Further, the described MVSD can have preprogrammed instant messages saved in its memory that can be used to send instant messages from a mobile electronic device in the motor vehicle. A preprogrammed instant message can be sent by verbally/audibly commanding the MVSD to send the desired preprogrammed instant message to any person when instructed to do so.

In another embodiment, the described MVSD can be programmable to program and save instant messages in to the memory of a MVSD, thereby allowing for customized saved instant messages that can be used later. The programmed instant messages can be used to reply to instant messages received by a mobile electronic device, and/or can be used to send an instant message. A programmed instant message can be sent by verbally/audibly commanding the MVSD to send the desired programmed instant message to any person when instructed to do so.

In another embodiment, the described MVSD can interchange text messages for email messages; can interchange email messages for text messages; can use other messages delivery systems including voice messaging, instant messaging, and all other forms of messaging currently invented and to-be invented in the future, with full functionality of the messaging services and as described herein. Further, the described MVSD can use the programmable and preprogrammable features as described herein.

In another embodiment, the described MVSD can be set to automatically send a reply text message to a text message received by a mobile electronic device while the motor vehicle is moving, driving, and/or the motor vehicle's drive or reverse mechanism/transmission is engaged. The text message can be a preprogrammed message, a custom message programmed by a person, and/or any combination thereof.

In another embodiment, the described MVSD can automatically begin any text message, email message, instant message, and any other message sent by the driver of a motor vehicle with a preset sentence and/or phrase. An example of a preset sentence and/or phrase may be, "I'm driving right now." The example given is for illustrative purposes only and does not limit or restrict the described MVSD to the example.

In another embodiment, the described MVSD can automatically end any text message, email message, instant message, and any other message sent by the driver of a motor vehicle with a preset sentence and/or phrase. An example of a preset sentence and/or phrase may be, "I will contact you when I reach my destination and have parked the car." The example given is for illustrative purposes only and does not limit or restrict the described MVSD to the example.

In another embodiment, the described MVSD can prevent the ignition of a motor vehicle from 'turning on' or starting the motor vehicle when one or more mobile electronic devices are powered 'on' and are in the motor vehicle, until the one or more mobile electronic devices are placed in a MVSD, placed in a MVSD secure location, placed in a secure location, powered 'off', otherwise disabled, and/or separately or in any combination thereof, or any other variation described herein.

In another embodiment, the described MVSD cannot be disabled, rewired, reconfigured, altered, and/or otherwise changed, adapted, and/or modified in any form, or way. If any of the aforementioned occurs and/or is attempted, the motor vehicle's ignition will not function, thereby not allowing the motor vehicle to turn 'on' or start. The motor vehicle can be useless and/or undrivable until a new MVSD is installed by a certified person, as described herein, or the altered MVSD is restored by a certified person, as described herein.

In another embodiment, the described MVSD can have and use Global Positioning System (GPS) technology; can have and use proprietary tracking systems and technologies; can have and use all tracking systems and technologies; can have and use proprietary geographical positioning systems and technologies; can have and use all geographical positioning systems and technologies; can have and use proprietary location recognition systems and technologies; can have and use all location recognition systems and technologies; and can have and use all location positioning and tracking systems and technology, invented or to be invented in the future, with all the necessary components, mechanisms, and accessories and, built in to the described MVSD.

For clarification, all current and future positioning systems; all position tracking technology and systems; all location recognition systems and technology; and all technology that provides for location, positioning, and tracking, separately and in any combination, will herein be referred to as Location Services system.

In another embodiment, the described MVSD can use, interact with, function with, and work with one or more external Location Services system technologies invented or to be invented in the future, with all necessary and accessory components and mechanisms, to provide functionality of one or more of the capabilities of all Location Services system technology.

In another embodiment, the described MVSD can have its Location Services system technology turned off, thereby turning off its systems and features of internal Location Services system. Further, the described MVSD have its Location Services system technology turned off and turn off the ability to use external Location Services system technology. The described MVSD can have the option to turn off either of the aforementioned, both of the aforementioned, in any and all combination thereof.

In another embodiment, the described MVSD can have its Location Services system technology turned off, but automatically turn on its Location Services system technology and/or use any available external Location Services system technology if the motor vehicle is in an accident.

In another embodiment, the described MVSD Location Services system can be programmable for mapping; route direction; and any and all other features, functions, and abilities that Location Services system technology currently provides and will provide in the future.

In another embodiment, the described MVSD can use Location Services system for directions to/from one or more locations; for one or more routing purposes; separately, together, and/or in any combination or variation thereof; and can be programmable and saved; and can audibly announce through the one or more MVSD speakers and/or the one or more motor vehicle's speakers the directions, routing, upcoming turns, etc.; and can recalculate and/or reroute when necessary or when manually requested; necessary for navigation to/from one or more locations.

In another embodiment, the described MVSD can provide hands-free ability to change and/or make new requests for directions and/or routing using one or more voice-activated programs to interact with a MVSD Location Services system. A MVSD Location Services system, program, can be voice-activated and can interact with voice commands to perform the requested functions/programs. An example of which would be to make changes to existing routes/directions, and continue. The aforementioned is for illustrative purposes only and does not limit or restrict the MVSD to the example.

In another embodiment, the described MVSD can save, store, and/or program locations, destinations, and postal addresses in its memory for use with its Location Services system; for use with the location services of a mobile electronic device; for use with a motor vehicle's location services system; separately or in any combination therein.

In another embodiment, the described MVSD can communicate and interact with one or more mobile electronic devices in a motor vehicle, and if a mobile electronic device has location technology, such as GPS or other, the MVSD can use and interact with the mobile electronic device's location service technology, providing the same services, seamlessly.

In another embodiment, the described MVSD can communicate and interact with one or more mobile electronic devices in a motor vehicle, and if a mobile electronic device has location technology, the MVSD can have the ability to turn the power of the mobile electronic device's location technology "on" and "off". If a mobile electronic device has its location technology powered "off", the MVSD can power it on; and if a mobile electronic device has its location technology powered "on", the MVSD can power it "off".

In another embodiment, the described MVSD can communicate and interact with one or more mobile electronic devices in a motor vehicle, and if there are more than one mobile electronic devices in a motor vehicle with location technology, and one or more mobile electronic device's location technology is turned "off" and other mobile electronic devices have their location technology turned "on", the MVSD can use the location technology of the mobile electronic devices that have location technology turned "on".

In another embodiment, when a motor vehicle with the described MVSD is in an accident, the MVSD can use its Location Services technology; can use the location technology of a mobile electronic device in the motor vehicle; can turn "on" one or more location technology that is turned "off"; and can use the location technology to communicate the location of the motor vehicle in the accident to emergency services and personnel.

In another embodiment, the described MVSD can honor the pre-selected and/or selected settings for each mobile electronic device in a motor vehicle.

In another embodiment, the described MVSD can communicate and interact with one or more mobile electronic devices in a motor vehicle, and if a MVSD has its Location Services system turned "on", the one or more mobile electronic devices can use the Location Services system of the MVSD.

In another embodiment, the described MVSD shall always allow the driver and any passenger within the motor vehicle the ability to make emergency phone calls.

In another embodiment, the described MVSD can automatically make emergency phone calls (911) when the motor vehicle is in an accident, and inform emergency services of the motor vehicle's current location.

In another embodiment, the described MVSD can automatically send text messages to emergency 911 centers, informing them of an accident and informing emergency services of the motor vehicle's current location.

In another embodiment, in an emergency situation the described MVSD can automatically transmit the current location of the motor vehicle to emergency 911 centers when the motor vehicle is in an accident, using its Location Services system and/or another location technology.

In another embodiment, when one or more of a motor vehicle's airbags have deployed, the described MVSD can immediately contact emergency services by 911 phone call; send one or more email, text, instant, or other message to emergency 911 center; can transmit the current location of the motor vehicle to emergency 911 center; can inform the emergency 911 center of an accident; can open communication platform so driver and one or more passengers can audibly communicate and interact with emergency personnel; all can be done separately and in any combination therein.

In another embodiment, the described MVSD can sense when the motor vehicle is in the process of rolling over, has rolled over; flips onto its side; or is in motion or position other than four wheels on the ground, the MVSD can communicate with emergency 911 services by telephone, text message, and/or by using any and all forms of communication resources available, and the current location of the motor vehicle.

In another embodiment, as described previously and herein, the described MVSD can communicate with one or more emergency 911 centers and/or other emergency services immediately, automatically, in preset delay, automatically preset delay, automatically immediately, and/or in any combination or variation therein.

In another embodiment, the described MVSD can have one or more sensors that can be placed in any location or on any location inside a motor vehicle and have full functionality.

In another embodiment, the described MVSD can have one or more sensors that can be placed in any location or on any location outside a motor vehicle and have full functionality.

In another embodiment, the described MVSD can be placed in any location inside a motor vehicle and have full functionality.

In another embodiment, the described MVSD can be placed in any location outside of a motor vehicle and have full functionality.

In another embodiment, the described MVSD can have a MVSD sensor locator to locate one or more MVSD sensors inside a motor vehicle; on a motor vehicle; outside a motor vehicle; and have the ability to identify the one or more sensors and to know if the one or more MVSD sensors are in their original location(s), and/or if one or more of the MVSD sensors has been moved to a new location, and/or if one or more of the MVSD sensors has been removed from a motor vehicle.

In another embodiment, the described MVSD can have one or more sensor location programs that can save the original location of one or more MVSD sensors inside a motor vehicle; on a motor vehicle; outside a motor vehicle; and have the ability to identify the one or more sensors and to know if the one or more MVSD sensors are in their original location(s), and/or if one or more MVSD sensors has been moved to a new location, and/or if one or more MVSD sensors has been removed from a motor vehicle. The MVSD sensor location program can be a software program that can work in mobile electronic devices, computers, and all other devices.

In another embodiment, the described MVSD can have one or more sensor location programs that can work with one or more sensor locators to identify and locate one or more MVSD sensors inside and outside a motor vehicle. The MVSD location program and MVSD locator can be in wired and/or wireless communication with each other.

In another embodiment, the described MVSD sensor location program(s) described herein can prevent a motor vehicle from engaging its drive and/or reverse transmission if one or more MVSD sensors have been moved from their original locations.

In another embodiment, the described MVSD can identify and locate one or more MVSD sensors, and can display the location of sensors.

In another embodiment, the described MVSD can identify and locate one or more MVSD sensors, and can display the location of sensors on remote electronic devices.

In another embodiment, the described MVSD can have a software program for computers, electronic tablets, mobile electronic devices, and other electronic devices currently in production or in the future, that can identify and locate one or more MVSD sensors inside and outside a motor vehicle and can display the location of sensors.

In another embodiment, the described MVSD can have a mobile electronic device locator that can locate one or more mobile electronic devices in a motor vehicle and save the location of the one or more mobile electronic devices in the motor vehicle in to the memory of the MVSD, thereby having the ability to know the location of the one or more mobile electronic devices within the motor vehicle.

In another embodiment, the described MVSD can have a mobile electronic device locator, as described in paragraphs herein, which can know/sense the distance of one or more mobile electronic devices in a motor vehicle from the MVSD; determine the proximity of the one or more mobile electronic devices to the MVSD; determine the proximity of the one or more mobile electronic devices to one or more MVSD sensors in a motor vehicle; determine the proximity of the one or more mobile electronic devices to the one or more secure locations, as described herein; determine if the one or more mobile electronic devices are in or have moved to a proximity too close to the driver of the motor vehicle, thereby triggering and causing the MVSD safety features to immediately engage; determine if the one or more mobile electronic devices are too close in proximity to the driver of the motor vehicle; and the MVSD mobile electronic device locator can monitor the location of the one or more mobile electronic devices located in the motor vehicle and initiate safety measures provided by the MVSD when the location of the one or more mobile electronic devices are too close and/or have moved from their original safe locations to a proximity too close to the driver of the motor vehicle.

In another embodiment, the described MVSD can use its locator features to engage safety measures when one or more mobile electronic devices in a motor vehicle are moved from a secure location; moved from a predetermined safe distance from the driver of a motor vehicle; when the one or more mobile electronic devices are turned on or powered on from a powered off state and then determined to be too close in proximity to the driver of the motor vehicle; and other similar situations, the MVSD can disable the one or more mobile electronic devices until the motor vehicle has stopped and the transmission is in the park position (the motor vehicle is parked).

In another embodiment, the described MVSD can have a sensor locator feature and system that can locate one or more sensors in a motor vehicle and save the locations of the one or more sensors in to the memory of the MVSD; and the MVCD sensor locator can determine if one or more of the MVSD sensors are in a different location than their original position or location, the MVSD can prevent the motor vehicle from engaging the drive and/or reverse transmission mechanism, thereby preventing the motor vehicle from driving.

In another embodiment, the described MVSD can have a sensor locator feature and system that can identify the locations of one or more MVSD sensors in a motor vehicle, and if one or more of the MVSD sensors are in a different location from their original location, and if there are any mobile electronic devices in the motor vehicle, the MVSD can render the one or more mobile electronic devices unavailable for use, and/or useless, and/or render the displays and screens black, thereby making them useless. This is to prevent the circumvention of safety protocol of the MVSD and prevent the use of one or mobile electronic devices while the motor vehicle is in the drive or reverse transmission position, in other words, while the motor vehicle is moving/driving. When the motor vehicle is parked and shut off, the disabled mobile electronic devices will be able to be used again.

In another embodiment, the described MVSD can be programmable.

In another embodiment, the MVSD can have one or more batteries to provide power to the MVSD. The one or more batteries can be rechargeable. The one or more batteries can be removably replaced when be one or batteries are out of power. The one or more batteries can be used to power the MVSD when there is no power provided by a motor vehicle's battery and/or electrical system when the motor vehicle is powered on and running/operating.

In another embodiment, the described MVSD can be powered by a motor vehicle's battery and/or electrical system.

In another embodiment, the described MVSD can be powered by one or more batteries. The batteries can be rechargeable and/or non-rechargeable, and/or any combination of chargeable and non-rechargeable.

In another embodiment, the described MVSD can be powered by any combination of the motor vehicle's power system and battery power (rechargeable and non-rechargeable), and batteries in the MVSD that can be rechargeable and non-rechargeable.

In another embodiment, the described MVSD can be powered by the motor vehicle's battery and power system, and the MVSD can have one or more batteries that would be used in a power outage of the motor vehicle or when the motor vehicle's battery(s) is/are unavailable.

In another embodiment, the described MVSD can have its own power source and be fully functional if a motor vehicle has no power, if a motor vehicle is turned off or not power on.

In another embodiment, the described MVSD can provide charging capabilities for one or more mobile electronic devices in a motor vehicle, providing charging access through wired connections; through wireless connections; through plug-in connections; and by any other means of charging batteries invented and to be invented in the future.

In another embodiment, the described MVSD can have memory technology to provide memory capability and storage of data. The memory technology can be currently invented or to be invented in the future.

In another embodiment, the described MVSD can have all necessary components to provide electronic functions.

In another embodiment, the described MVSD can have one or more monitors or display screens that can be touch-screen and/or non-touch-screen.

In another embodiment, the described MVSD can have one or more monitors or display screens that can be backlit and/or non-backlit, and in any combination, and can use current display systems and mechanisms, as well as those to be invented in the future.

In another embodiment, the described MVSD can have one or more display screens and/or monitors that can be colorized and/or black-and-white, and in any combination.

In another embodiment, the described MVSD can have one or more display screens and/or monitors that allow the user the ability to program, modify functions, and other capabilities of an interactive, programmable mobile electronic device.

In another embodiment, the described MVSD can have one or more display screens and/or monitors that allow the user the ability to program functions and functionality; modify functions and functionality; monitor the functions of the MVSD; monitor the locations, positions, and other aspects of at least one mobile electronic device, as described herein; and other capabilities monitors and display screens currently invented and to be invented. The one or more display screens and/or monitors can be programmed to go dark, black screen, when the motor vehicle's transmission is engaged in forward or reverse, providing no visual distraction for the driver or operator of the motor vehicle.

In another embodiment, the described MVSD can have and use one or more microprocessors, Nano-processors, or other processors invented or to be invented in the future.

In another embodiment, the described MVSD can have and use one or more electronic integrated circuits such as a microchip(s), a Nano chip(s), or other electronic integrated circuits invented or to be invented in the future.

In another embodiment, the described MVSD can include at least one wireless transmitter. The MVSD can have and use current wireless technology and/or wireless technology invented in the future.

In another embodiment, the described MVSD can include at least one wireless receiver. The MVSD can have and use use current wireless technology and/or wireless technology invented in the future.

In another embodiment, the described MVSD can include at least one wireless transmitter and at least one wireless receiver. The MVSD can use current wireless technology and/or wireless technology invented in the future In another embodiment, the described MVSD can have components necessary to perform the functions and capabilities described and implied herein. The components can include and are not limited to the following: memory technology, wireless communication systems and technologies, wired communication systems and technologies, combination of wired and wireless communication systems and technologies, photovoltaic systems and technologies, any and all other components needed to provide the necessary functions described and implied herein. The aforementioned list is an illustrative and informative example, and does not limit the embodiments described herein to only these examples, functions, and capabilities.

In another embodiment, the described MVSD can have a self-charging system that allows the one or more batteries of the MVSD to charge while the motor vehicle is in operation, or by using photovoltaic membranes and systems, or anther charging systems, and in any combination thereof.

In another embodiment, the described MVSD can have solar electronic systems and mechanisms, and can have photovoltaic membranes, systems and mechanisms, that can provide power to the MVSD and can provide power the charge the one or more batteries of the MVSD.

In another embodiment, the described MVSD can charge one or more batteries, can provide battery charging for one or more mobile electronic devices, can charge the batteries of one or more mobile electronic devices, and/or any combination therein and thereby.

In another embodiment, the described MVSD can be a Wi-Fi transmitter, "hot spot", and/or provide Wi-Fi connections for one or more mobile electronic devices that are associated with the MVSD, or are in the motor vehicle where the MVSD is present and powered on.

In another embodiment, the described MVSD can have one or more MVSD sensors that can interact with and communicate with one or more mobile electronic devices in a motor vehicle.

In another embodiment, the described MVSD can have one or more MVSD sensors that can communicate with and interact with one or more MVSD in a motor vehicle.

In another embodiment, the described MVSD can have one or more MVSD sensors in a motor vehicle. A MVSD can have one or more MVSD sensors built-in to it, added on to it, built-on to it, not attached to it, and in any combination therein, and can communicate with one or more MVSD sensors in a motor vehicle, regardless of where any MVSD sensor is located.

In another embodiment, the described MVSD can have one or more MVSD sensors that can be added to a motor vehicle at any time.

In another embodiment, the described MVSD can have one or more MVSD sensors built in to a motor vehicle.

In another embodiment, one or more of the described MVSD can be built-in to a motor vehicle, built on to a motor vehicle, placed in or on to a motor vehicle, attached to a motor vehicle, removable attached to a motor vehicle, and in any combination therein.

In another embodiment, the described MVSD can have wireless telephone capability, systems, mechanisms, technologies, and services, and can have its own telephone number and communication identity, separately and in any combination therein.

In another embodiment, the described MVSD can have satellite telephone capability, systems, mechanisms, technologies, and services, and can have its own telephone number and communication identity, separately and in any combination therein.

In another embodiment, the described MVSD can provide telephone service, originating telephone calls and receiving telephone calls for all telephones.

In another embodiment, the described MVSD can provide, use, and receive satellite radio stations, their audio broadcasts, and all satellite communications, separately and in any combination therein.

In another embodiment, the described MVSD can be portable and can be used in one or more motor vehicles, having full capabilities of all features, components, systems, and mechanisms, described herein, separately or in any combination therein.

In another embodiment, the described MVSD can be programmed to associate with one or more motor vehicles by programming the one or more motor vehicles' Vehicle Identification Number (VIN) in to the MVSD, saving the VIN in to the memory of the MVSD. Any and all other methods and processes to register a motor vehicle can be used in place of or in conjunction with the aforementioned numbers, depending on the locale and country.

In another embodiment, one or more of the described MVSD can be used in an airplane or aircraft, with the full functionality of all features, components, systems, and mechanisms described herein, and in any combination therein.

In another embodiment, the described MVSD can be programmed to associate with one or more airplanes or aircrafts by programming the one or more airplanes or aircrafts serial number and/or the registration number in to the MVSD, saving the serial numbers and/or US registration Numbers in to the memory of the MVSD. Any and all other methods and processes to register an airplane or aircraft can be used in place of or in conjunction with the aforementioned numbers, depending on the locale and country.

In another embodiment, one or more of the described MVSD can be used in a passenger train and non-passenger train, with the full functionality of all features, components, systems, and mechanisms described herein, and in any combination therein.

In another embodiment, the described MVSD can be programmed to associate with one or more passenger trains or non-passenger trains by programming the one or more passenger trains or non-passenger trains serial numbers and/or the registration number in to the MVSD, saving the serial number and/or registration number in to the memory of the MVSD. Any and all other methods and processes to register a passenger train and non-passenger train can be used in place of or in conjunction with the aforementioned numbers, depending on the locale and country.

In another embodiment, the described MVSD can be portable and can be fully functional in one or more locations.

In another embodiment, the described MVSD can have a sensor in a secured location and/or compartment and the sensor can confirm that the driver's one or more mobile electronic devices are inside the secured location; the sensor can communicate with the MVSD that the driver's one or more mobile electronic devices are in the secured location; the secured location is in the closed position or other formation that makes the one more mobile electronic devices unavailable for the driver's (and/or passengers') hands-on and visual use. Once this has been established, the MVSD can allow the motor vehicle's transmission to be engaged in reverse and/or drive. The motor vehicle's transmission cannot be engaged unless the identified driver's one or more mobile electronic devices are in a secured location, as described herein. Further, the MVSD may also require that the passengers' one or more mobile electronic devices be inside the secured location before the motor vehicle's transmission can engage reverse and/or drive.

In another embodiment, the described MVSD can have software, software programs, and/or software applications. The software, software programs, and/or software applications can be manually and/or automatically downloaded and installed in to the MVSD; and the software, software programs, and/or software applications can be manually and/or automatically updated, with the updates being downloaded and installed in to the MVSD.

In another embodiment, the described MVSD can have software, software programs, and/or software applications that can be downloaded and installed in to mobile electronic devices; and the software, software programs, and/or software applications can be manually and/or automatically updated, with the updates being downloaded and installed in to mobile electronic devices.

In another embodiment, the described MVSD can have software, software programs, and/or software applications that can be downloaded and installed in to motor vehicles, including trains, trams, trolleys, light rail and all other motor vehicles; and the software, software programs, and/or software applications can be manually and/or automatically updated, with the updates being downloaded and installed in to motor vehicles, including trains, airplanes, trams, trolleys, light rail and all other motor vehicles.

In another embodiment, the described MVSD can have software, software programs, and/or software applications that can have a preset condition to automatically download and install upgrades; and the upgrades can be manually downloaded and installed in to the MVSD.

In another embodiment, the described MVSD can have software, software programs, and/or software applications that can be manually and/or automatically upgraded, with the upgrades being downloaded and installed in to the MVSD.

In another embodiment, the described MVSD can have software, software programs, and/or software applications in motor vehicles that can be manually and/or automatically upgraded, with the upgrades being downloaded and installed in motor vehicles; the motor vehicles including trains, airplanes, trams, trolleys, light rails, and all other motor vehicles.

In another embodiment, the described MVSD can have software, software programs, and/or software applications in mobile electronic devices that can be manually and/or automatically upgraded, with the upgrades being downloaded and installed in to mobile electronic devices.

In another embodiment, the described MVSD can have software, software programs, and/or software applications for one or more mobile electronic devices that communicate, interact, and connect with one or more MVSD and with one or more MVSD sensors located in one or more secure locations in a motor vehicle. An example of a secure location may be a motor vehicle's "glove box" (an open/closeable compartment). The one or more MVSD sensors in the "glove box" can sense when one or more mobile electronic devices are placed inside the "glove box" and when the "glove box" is closed. When the "glove box" is closed and a mobile electronic device is inside, the one or more MVSD sensors communicates with the software application of the mobile electronic device to confirm its proximity to the "glove box" and that the "glove box" is closed, and communicates with the MVSD. The MVSD communicates with the motor vehicle and allows the motor vehicle transmission to engage its drive and reverse mechanisms, thereby allowing the motor vehicle to be driven and/or operated. The example described is for illustrative purpose only and the MVSD in no way limited to this example.

In another embodiment, the described MVSD can have components and additional devices that can interact with a MVSD to enhance its capabilities. An example a component can be a voice-activation feature that can wirelessly communicate with the MVSD and/or one or more mobile electronic devices in a motor vehicle, and can be used to activate a mobile telephone and prompt for a phone call to be placed hands-free. This is an example of only one of many components and/or additional devices that can be used with a MVSD and does not limit the described MVSD and embodiments herein to this example.

In another embodiment, the described MVSD can have an alert notification system to automatically notify a person if one or more mobile electronic devices are removed from and/or moved in or from a secure location in a motor vehicle while the motor vehicle is driving and/or moving. The notification can go to a person not in the same motor vehicle; can notify law enforcement; and can notify any person not in the motor vehicle by using an instant message; an instant text message; an email; and can initiate and make a phone call, and/or other notification methods, separately and/or in any combination therein. The notification can notify the removal of a mobile electronic device from a secure location while a motor vehicle is moving.

In another embodiment, the described MVSD can have an alert notification system to automatically notify a person not in the motor vehicle, if one or more mobile electronic devices are removed from and/or moved from a secure location in a motor vehicle while the motor vehicle is driving and/or moving. The notification can be to a parent; a guardian; a supervisor; law enforcement; and can notify any person not in the motor vehicle by using an instant message; an instant text message; any type of message and instant message; an email; and can initiate and make a phone call; and any other notification method, separately and/or in any combination therein. The notification can notify the removal of a mobile electronic device from a secure location while a motor vehicle is moving.

In another embodiment, the described MVSD can have an alert system to automatically turn on a motor vehicle's hazard lights if one or more mobile electronic devices are removed and/or moved from a secure location in the motor vehicle while the motor vehicle is driving and/or moving. The hazard lights can blink in standard cadence, and/or an alternative cadence to notify other drivers on the road that the driver of the motor vehicle is holding/using/attempting to use the one or more mobile electronic devices. The alternative cadence can be a varying sequence of blinking hazard lights, alternating blinking of lights, or any other possible variation.

In another embodiment, the described MVSD can have an alert system to automatically sound an alert sound/noise/beep within the motor vehicle if a mobile electronic device is removed and/or moved from a secure location in a motor vehicle while a motor vehicle is driving. This notification can be a voice that speaks a warning. The alert sound can be broadcasted continuously until the one or more mobile electronic devices have been returned to or placed in a secure location.

In another embodiment, the described MVSD can have an automatic accelerator pedal kill feature that first sounds an alert sound/noise/beep within the motor vehicle if one or more mobile electronic devices are removed and/or moved from a secure location in the motor vehicle while the motor vehicle is driving and/or moving. If the one or more mobile electronic devices are not returned to the secure location and properly stored within a certain amount of time from when it was removed and/or moved, the MVSD will automatically kill the accelerator pedal of the motor vehicle, preventing the vehicle from receiving power from the accelerator pedal, thereby slowing the motor vehicle to a stop if the mobile electronic device is not returned to the secure location and properly stored.

In another embodiment, the described MVSD can be portable, thereby be used in one or more motor vehicles. However, when an MVSD is not located in a motor vehicle, that motor vehicle can be rendered undrivable, meaning that motor vehicle cannot be driven until an MVSD is placed in to the motor vehicle, with the MVSD communicating with the motor vehicle to inform the motor vehicle of its presence inside the motor vehicle and that the MVSD is properly functioning.

In another embodiment, the described MVSD can be required to be in a motor vehicle for the motor vehicle to operate its transmission, thereby making any motor vehicle inoperable without a MVSD.

In another embodiment, the described MVSD can perform a safety check of itself and its functions and features, with the safety checks being performed at a preset or predetermined time period; safety checks being performed each time the motor vehicle is turned on, powered on, or otherwise available for use; safety checks being triggered by usage, an action, or event; and the safety check can be performed manually by a user.

In another embodiment, the described MVSD can save in to the memory of the MVSD the results of safety checks, and can save the results of the safety checks to a permanent memory device, to save the MVSD history of usage.

In another embodiment, the described MVSD can save in to memory any interaction the MVSD may have with one or more mobile electronic devices. The results can be downloaded from the MVSD to a USB device, wirelessly to the owner's computer or other device.

A driver or operator of a motor vehicle will not be able to have hands-on usage of one or more mobile electronic devices while they are driving and/or operating a motor vehicle. Further, this can mean that they cannot have one or more mobile electronic devices, that are powered on, on their lap; in a pocket of clothing they are wearing; in their hand; on their body; attached to their person in any way; within the reach of their hand or foot; within their eye sight or view of the display of the one or more mobile electronic devices; and/or any other location that may allow the driver or operator of the motor vehicle physical and/or visual access to the one or more mobile electronic devices. A driver or operator can turn on or power on the motor vehicle while it is in the "park" position, and if the motor vehicle remains in "park" position, the driver or operator can use one or more mobile electronic devices. However, when the driver or operator wants to engage the drive or reverse transmission mechanism to drive or move the motor vehicle, the driver or operator must turn the power off of the one or more mobile electronic devices; place the one or more mobile electronic devices in one or more MVSD secure locations; place the one or more mobile electronic devices in a MVSD; place the one or more mobile electronic devices in a designated secure location that has at least one MVSD sensor; place the one or more mobile electronic devices in another location deemed to be secure or designated secure by the MVSD; separately or in any combination therein, before the motor vehicle can be driven or operated, and/or before the motor vehicle's forward drive or reverse transmission can be engaged. Once the one or more mobile electronic devices are sensed and confirmed by a MVSD and/or a MVSD sensor to be in a secure location, the MVSD will allow the motor vehicle to engage its drive or reverse transmission to be engaged, thereby allowing the motor vehicle to be driven or operated, to move. This example is for illustrated purposes only and dose not limit or restrict the described MVSD to this example.

If there are one or more passengers in a motor vehicle, the passengers' one or more mobile electronic devices in the motor vehicle must be secured as described in previous paragraphs and herein. Further, the motor vehicle may have one or more MVSD sensors located/positioned to monitor one or more mobile electronic devices of the passengers, the one or more mobile electronic devices of the passengers must remain in proximity to one or more MVSD sensors. If a passenger's mobile electronic device is moved outside of a MVSD sensor's zone, thereby moving out of a permitted and/or secured distance from a sensor, the MVSD will render the one or more mobile electronic devices useless; render the one or more mobile devices' display black; can do any and all other actions as previous described herein, separately or in any combination. These actions taken by the MVSD is done to prevent one or more passengers from passing, handing, showing one or more mobile electronic devices to the driver or operator of the motor vehicle, which would distract the driver or operator of the motor vehicle.

In another embodiment, the described MVSD can be portable, with all its capabilities described herein, to be used outside of a motor vehicle. For illustrative purposes only and not to provide limitations in any way, one example could be to use one or more MVSD in a house to provide an option for people in a house to place one or more mobile electronic devices in a MVSD to safely store one or more mobile electronic devices, providing mobile electronic device-free areas.

In another embodiment, the described MVSD can be weatherproof and/or waterproof, and can be a standalone device that can be used inside or outside a motor vehicle, a home, any structure, and the MVSD can provide a safe, secure location to place one or more mobile electronic devices, electronic devices, or other devices, separately or in any combination therein. The terms "weatherproof" and "waterproof" is to be interpreted in its fullest meaning.

In another embodiment, the described MVSD can be used in a house or any other structure, and the MVSD can communicate and interact with home electronic devices, such as and not limited to a stereo system, electronic tablet devices, computers, and other electronic devices, and the MVSD can use all its functions and embodiments described herein.

While only selected embodiments have been chosen to illustrate the present invention, it will be apparent to those skilled in the art from this disclosure that various changes and modifications can be made herein without departing from the scope of the invention. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature, which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention. Therefore the illustrated examples of the present invention are used as an example of the numerous uses of the present invention in all motor vehicles and with all electronic devices, in all models, styles, shapes, and sizes, and do not limit the present invention to the scope of the examples, rather illustrate the versatility of the present invention.

DRAWINGS

To enable a further understanding of the different aspects and the technological features described herein, the brief descriptions of the drawings below followed by the detailed description of the preferred embodiments.

Because there is an almost infinite combination and configuration of, and no limit to the number of MVSD, MVSD sensors, mobile electronic devices, and locations of each of the aforementioned within a motor vehicle and outside a motor vehicle, the drawings herein are illustrative examples of a few possible configurations and combinations, and therefore the drawings and descriptions herein do not limit the application to the examples given, illustrations provided, and/or any combination. There can be other combinations and configurations of devices, mechanisms, and systems described herein that may not be illustrated, it will be apparent to those skilled in the art from this disclosure that the following descriptions of the embodiments of the motor vehicle safe driving devices are provided for illustration purpose only and not for the purpose of limiting the motor vehicle safe driving device to the illustrations.

Further, FIG. 5A of the Drawings provides a Symbol Legend for the symbols used and the many possible combinations available. Using the symbols from the Drawings of FIG. 5A and referring back to the examples of a couple configurations in FIGS. 1A-1C, 2A, 2B, 3A-C, 4A, 4B, 5A and 5B, can illustrate some of the many different possible combinations and configurations for the described MVSD and its devices, mechanisms, systems, and their interaction with sensors and mobile electronic devices. The drawings that are illustrated, as well as any and all other possible combinations and/or configurations that are not illustrated in the drawings, and any and all intended aspects and embodiments illustrated and not illustrated are to be included and part of the described MVSD herein.

FIG. 1A shows a block diagram of a MVSD and a mobile electronic device in a motor vehicle.

FIG. 1B shows a block diagram of a MVSD with a mobile electronic device in the MVSD, both in a motor vehicle.

FIG. 1C shows a block diagram of a MVSD with a mobile electronic device partially in and out of the MVSD, both in a motor vehicle.

FIG. 2A shows a block diagram of a MVSD on the outside of a motor vehicle and a mobile electronic device in the motor vehicle.

FIG. 2B shows a block diagram of a MVSD outside a motor vehicle and a mobile electronic device in the motor vehicle.

FIG. 3A shows a block diagram of a MVSD, a MVSD sensor, and a mobile electronic device in a motor vehicle.

FIG. 3B shows a block diagram of a MVSD with a mobile electronic device in the MVSD, and a MVSD sensor, all in a motor vehicle.

FIG. 3C shows a block diagram of a MVSD with a mobile electronic device partially in and out of the MVSD, and a MVSD sensor, all in a motor vehicle.

FIG. 4A shows a block diagram of a MVSD on the outside a motor vehicle, with a MVSD sensor and a mobile electronic device in a motor vehicle.

FIG. 4B shows a block diagram of a MVSD outside a motor vehicle, with a MVSD sensor and a mobile electronic device in a motor vehicle.

DETAILED DESCRIPTION

Figure 5:
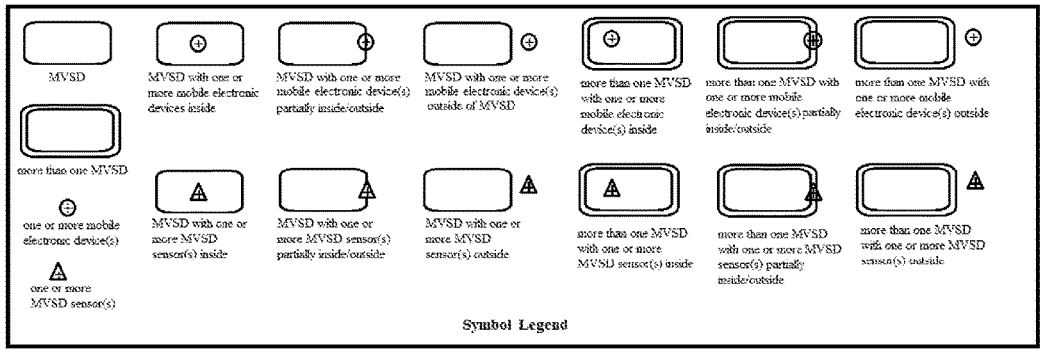
FIG. 5A shows a Symbol Legend with block diagrams and keys to symbols of possible configurations of MVSD.
FIG. 5B shows block diagrams of many possible configuration of one or more MVSD, one or more MVSD sensors, and one or more mobile electronic devices, all configurations can be used with the motor vehicle shown in FIG. 5B.
Figure 5:
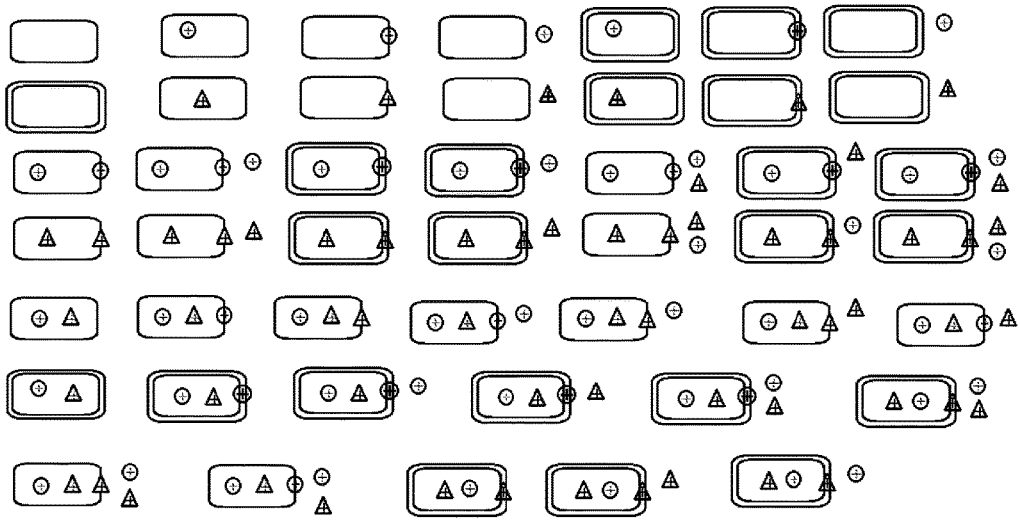
Figure 5:
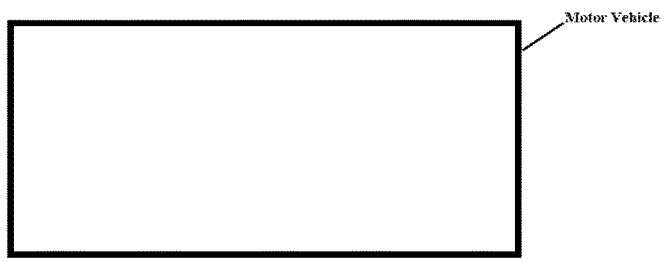

Selected embodiments of the motor vehicle safe driving device will now be explained with reference to the drawings. It will be apparent to those skilled in the art from this disclosure that the following descriptions of the embodiments of the motor vehicle safe driving devices are provided for illustration purpose only and not for the purpose of limiting the motor vehicle safe driving device to the illustrations and as defined by the appended claims and their equivalents.

Referring to FIGS. 1A, 1B, and 1C, three block diagram drawing examples of a MVSD 2 and a mobile electronic device 3 are illustrated with different configurations in a motor vehicle 1. FIG. 1A illustrates an example of a MVSD 2 located in a different or separate location than a mobile electronic device 3, both in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can interact with the mobile electronic device 3 and the motor vehicle 1 as previously described herein. The MVSD 2 can function in full as previously described herein. FIG. 1B illustrates an example of a mobile electronic device 3 in a MVSD 2, both in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can interact with the mobile electronic device 3 and the motor vehicle 1 as previously described herein. The MVSD 2 can function in full as previously described herein. FIG. 1C illustrates an example of a mobile electronic device 3 partially in and partially out of a MVSD 2, both in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can interact with the mobile electronic device 3 and the motor vehicle 1 as previously described herein. The MVSD 2 can function in full as previously described herein.

Shown in FIGS. 2A and 2B are block diagram illustrations of a mobile electronic device 3 in a motor vehicle 1 and a MVSD 2 on the outside of a motor vehicle 1. FIG. 2A illustrates an example of a MVSD 2 located on the outside of a motor vehicle 1 and in a different or separate location than a mobile electronic device 3 in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can interact with the mobile electronic device 3 and the motor vehicle 1 as previously described herein. The MVSD 2 can function in full as previously described herein. FIG. 2B illustrates an example of a MVSD 2 located outside of a motor vehicle 1 and in a different or separate location than a mobile electronic device 3 in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can interact with the mobile electronic device 3 and the motor vehicle 1 as previously described herein. The MVSD 2 can function in full as previously described herein.

Shown in FIGS. 3A, 3B, and 3C, are block diagram drawing illustration examples of a MVSD 2, a mobile electronic device 3, and a MVSD sensor 4 are illustrated with different configurations in a motor vehicle 1. FIG. 3A illustrates an example of a MVSD 2, a mobile electronic device 3, and a MVSD sensor 4, all located in different or separate locations and all in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can communicate with the MVSD sensor 4 via wireless and/or wired technology. The MVSD sensor 4 can interact with the mobile electronic device 3 and the MVSD 2. The MVSD 2, the MVSD sensor 4, the mobile electronic device 3, and the motor vehicle 1 can interact between and with each other in part and as a whole, and in any combination, as described herein. The MVSD 2 can interact with the mobile electronic device 3 and the motor vehicle 1 as previously described herein. The MVSD 2 can function in full as previously described herein. FIG. 3B illustrates an example of a mobile electronic device 3 in a MVSD 2, and a MVSD sensor 4, all located in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can communicate with the MVSD sensor 4 via wireless and/or wired technology. The MVSD sensor 4 can interact with the mobile electronic device 3 and the MVSD 2. The MVSD 2, the MVSD sensor 4, the mobile electronic device 3, and the motor vehicle 1 can interact between and with each other in part and as a whole, and in any combination, as described herein. The MVSD 2 can interact with the mobile electronic device 3 and the motor vehicle 1 as previously described herein. The MVSD 2 can function in full as previously described herein. FIG. 3C illustrates an example of a mobile electronic device 3 both partially in and partially out of a MVSD 2, and a MVSD sensor 4, all located in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can communicate with the MVSD sensor 4 via wireless and/or wired technology. The MVSD sensor 4 can interact with the mobile electronic device 3 and the MVSD 2. The MVSD 2, the MVSD sensor 4, the mobile electronic device 3, and the motor vehicle 1 can interact between and with each other in part and as a whole, and in any combination, as described herein. The MVSD 2 can interact with the mobile electronic device 3 and the motor vehicle 1 as previously described herein. The MVSD 2 can function in full as previously described herein.

Shown in FIGS. 4A and 4B are block diagram drawing illustration examples of a MVSD 2 on the outside of motor vehicle 1, a mobile electronic device 3 and a MVSD sensor 4 in a motor vehicle 1. FIG. 4A illustrates an example of a MVSD 2 on the outside of a motor vehicle 1, a mobile electronic device 3 and a MVSD sensor 4 located in different or separate locations in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can communicate with the MVSD sensor 4 via wireless and/or wired technology. The MVSD sensor 4 can interact with the mobile electronic device 3 and the MVSD 2. The MVSD 2, the MVSD sensor 4, the mobile electronic device 3, and the motor vehicle 1 can interact between and with each other in part and as a whole, and in any combination, as described herein. The MVSD 2 can interact with the mobile electronic device 3 and the motor vehicle 1 as previously described herein. The MVSD 2 can function in full as previously described herein. FIG. 4B illustrates an example of a MVSD 2 outside of a motor vehicle 1, a mobile electronic device 3 and a MVSD sensor 4 located in different or separate locations in a motor vehicle 1. The MVSD 2 can communicate with the mobile electronic device 3 via wireless and/or wired communication technology. The MVSD 2 can communicate with the motor vehicle 1 via wireless and/or wired technology. The MVSD 2 can communicate with the MVSD sensor 4 via wireless and/or wired technology. The MVSD sensor 4 can interact with the mobile electronic device 3 and the MVSD 2. The MVSD 2, the MVSD sensor 4, the mobile electronic device 3, and the motor vehicle 1 can interact between and with each other in part and as a whole, and in any combination, as described herein. The MVSD 2 can interact with the mobile electronic device 3 and the motor vehicle 1 as previously described herein. The MVSD 2 can function in full as previously described herein.

Shown in FIG. 5A are the different symbols and block drawings of one or more MVSD, one or more mobile electronic devices, one or more MVSD sensors, and the symbol legend to assist in illustrating some of the many different configurations possibilities.

Shown in FIG. 5B are block diagram drawing examples to illustrate some of the possible configurations of the one or more MVSD, one or more mobile electronic devices, one or more MVSD sensors, and a block diagram of a motor vehicle, with which the many symbols above the motor vehicle can interact with and be configured with.

Figure 6:
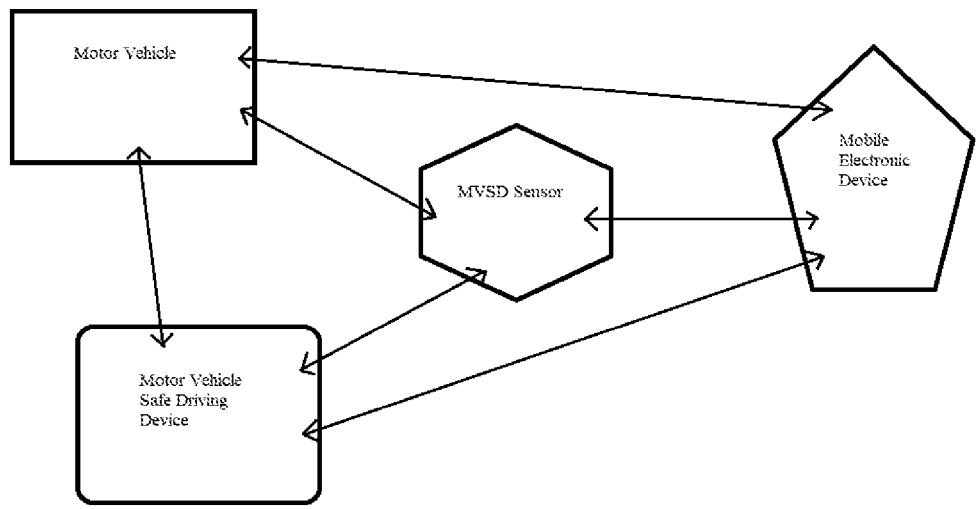
FIG. 6A shows a block diagram of wired interactions of a MVSD, a mobile electronic device, a MVSD sensor, and a motor vehicle.
FIG. 6B shows a block diagram of wireless interactions of a MVSD, a mobile electronic device, a MVSD sensor, and a motor vehicle.
Figure 6:
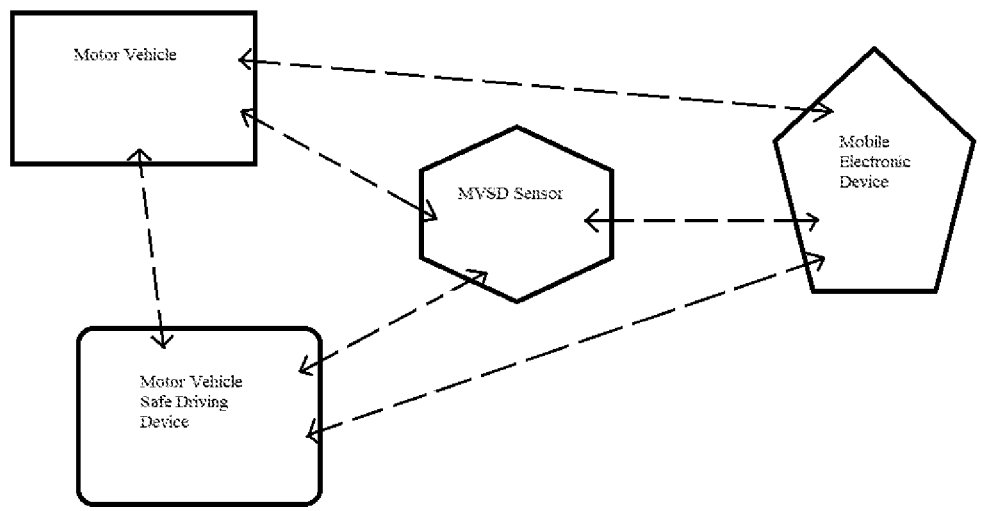

Shown in FIGS. 6A and 6B are block diagrams illustrating examples of possible communication and interaction between a motor vehicle, a MVSD, a MVSD sensor, and a mobile electronic device. FIG. 6A illustrates possible wired interactions and communications between a motor vehicle, a MVSD, a MVSD sensor, and a mobile electronic device. FIG. 6B illustrates possible wireless interactions and communications between a motor vehicle, a MVSD, a MVSD sensor, and a mobile electronic device.

The described MVSDs and all its components may vary in feature function, number, shape, size, and location, and the illustrations herein are for illustrative purposes only and the MVSD and its embodiments are in no way limited to these examples.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A motor vehicle safe driving device, comprising:
a housing including a compartment;
memory in the housing, the memory storing data in to the motor vehicle safe driving device;
at least one software application program for at least one mobile electronic device that allows interaction between the at least one mobile electronic device and the motor vehicle safe driving device;
a communication system providing interactive communication for the motor vehicle safe driving device,
wherein the communication system provides interactive communication between various features of the motor vehicle safe driving device, a motor vehicle's components and mechanisms, and the at least one mobile electronic device in the motor vehicle;
a transmission control system, the transmission control system interacts with a transmission system and mechanisms of the motor vehicle,
wherein the transmission control system communicates with the motor vehicle safe driving device to determine whether to allow or prohibit the engagement of a forward, drive, and reverse transmission mechanisms based on a location of the at least one mobile electronic device in the motor;
at least one sensor from multiple sensors within the motor vehicle;
a first or more sensors from the at least one sensor from multiple sensors attached to the motor vehicle safe driving device,
wherein a first or more sensors from the at least one sensor from multiple sensors detect, identify, locate, and monitor the at least one mobile electronic device in the motor vehicle and communicates the information of the at least one mobile electronic device to the motor vehicle safe driving device;
wherein the motor vehicle safe driving device analyzes the received information and determines the location of the at least one mobile electronic device and its accessibility to the operator or driver of the motor vehicle and communicates with the transmission control system;
wherein if the motor vehicle's forward, drive, or reverse transmission mechanism is engaged, and the first or more sensors from the at least one sensor from multiple sensors attached to the motor vehicle safe driving device detects, identifies, and locates the at least one mobile electronic device in an unsecure location, the motor vehicle safe driving device disables a display screen of the at least one mobile electronic device in an unsecure location;
a second or more sensors from the at least one sensor from multiple sensors wherein the second or more sensors from the at least one sensor from multiple sensors is in at least one compartment having the ability to open and close, providing the capacity to hold and secure the at least one mobile electronic device,
wherein the second or more sensors from the at least one sensor from multiple sensors detects, identifies, locates, and monitors the location of the at least one mobile electronic device while communicating with the motor vehicle safe driving device,
and when the at least one mobile electronic device is removed from the at least one compartment while the forward, drive, or reverse transmission mechanism of the motor vehicle is engaged, the second or more sensors from the at least one sensor from multiple sensors communicates the location of the at least one mobile electronic device that has been removed from the at least one compartment to the motor vehicle safe driving device, the motor vehicle safe driving device communicates and interacts with the at least one mobile electronic device that has been removed from the at least one compartment and disables the display screen of the at least one mobile electronic device, until the at least one mobile electronic device is either powered off or returned to and secured in the at least one compartment; and wherein the second or more sensors from the at least one sensor from multiple sensors detects when the at least one mobile electronic device is removed from the at least one compartment while the transmission mechanism of the motor vehicle is in park, the second or more sensors from the at least one sensor from multiple sensors communicates the removal of the at least one mobile electronic device from the at least one compartment of the motor vehicle safe driving device, the motor vehicle safe driving device communicates and interacts with the transmission control system, the transmission control system communicates and interacts with the transmission system and mechanisms of the motor vehicle prohibiting the engagement of the forward, drive, and reverse transmission mechanisms of the motor vehicle until the at least one mobile electronic device is either powered off or secured in the at least one compartment.

2. The motor vehicle safe driving device of claim 1, further comprising a third or more sensors from the at least one sensor from multiple sensors in one or more seating areas in the motor vehicle, wherein the third or more sensors from the at least one sensor from multiple sensors detects, locates, identifies, and monitors the location of the at least one mobile electronic device in the motor vehicle, the third or more sensors from the at least one sensor from multiple sensors communicates the location of the at least one mobile electronic device to the motor vehicle safe driving device, the motor vehicle safe driving device allowing or disabling the functionality of the display screen of the at least one mobile electronic device based on the location and orientation of the at least one mobile electronic device to the operator or driver of the motor vehicle; based on if the forward, drive, or reverse transmission mechanisms of the motor vehicle are engaged.

3. The motor vehicle safe driving device of claim 1, further comprising a display screen, wherein the display screen is disabled when the drive, forward, or reverse transmission mechanisms of the motor vehicle are engaged.

4. The motor vehicle safe driving device of claim 1, further comprising an emergency notification system that automatically notifies emergency services when the motor vehicle is involved in an accident and in an emergency situation.

5. The motor vehicle safe driving device of claim 1, further comprising at least one port on the housing, of which one is a battery charge port.

6. The motor vehicle safe driving device of claim 1, wherein the motor vehicle safe driving device monitors the at least one mobile electronic device in the motor vehicle, the motor vehicle safe driving device monitors and interacts with the at least one mobile electronic device, wherein the motor vehicle safe driving device detects when the at least one mobile electronic device is operating in a passenger seat area of the motor vehicle and when the display screen of the at least one mobile electronic device turns in the direction of the operator or driver of the motor vehicle, the motor vehicle safe driving device disables the display screen of the at least one mobile electronic device; wherein if the motor vehicle safe driving device or the at least one sensor from multiple sensors within the motor vehicle detects and identifies the at least one mobile electronic device is in the area of the operator or driver of the motor vehicle, the motor vehicle safe driving device disables the display screen of the at least one mobile electronic device; the motor vehicle safe driving device disables the keyboard of the at least one mobile electronic device; the motor vehicle safe driving device disables the applications of the at least one mobile electronic device; the motor vehicle safe driving device turns off the power of the at least one mobile electronic device.

7. The motor vehicle safe driving device of claim 1, wherein the motor vehicle safe driving device is placed in the glovebox of the motor vehicle, the glovebox of the motor vehicle having the ability to open and close, the motor vehicle safe driving device in the glovebox of the motor vehicle connecting to the motor vehicle, the glovebox of the motor vehicle containing the motor vehicle safe driving device becoming a secure location to hold and secure the at least one mobile electronic device, wherein if the motor vehicle's drive, forward, or reverse transmission mechanisms are engaged and the at least one mobile electronic device is removed from the glovebox of the motor vehicle, the motor vehicle safe driving device interacts with the at least one mobile electronic device that was removed from the glovebox of the motor vehicle, the motor vehicle safe driving device disables the display screen of the at least one mobile electronic device until the at least one mobile electronic device is either powered off or secured in the glovebox of the motor vehicle.

8. The motor vehicle safe driving device of claim 1, wherein the motor vehicle safe driving device has an attachment mechanism allowing the motor vehicle safe driving device to be removably attached to the motor vehicle, thereby providing portability for use in more than one motor vehicle.

9. The motor vehicle safe driving device of claim 1, further comprising at least one software program and technology providing the ability for the motor vehicle safe driving device to read aloud emails, text messages, and instant messages received by the at least one mobile electronic device in the motor vehicle and broadcast the messages through the at least one speaker.

10. The motor vehicle safe driving device of claim 1, further comprising a programmable feature comprising a program control on the housing and a programmable system in the housing that permits programming and storing of data in to the memory.

11. The motor vehicle safe driving device of claim 1, further comprising a voice-activation system that allows a person to speak aloud to activate and interact with the motor vehicle safety device, the motor vehicle safe driving device programs, components, and features, the motor vehicle safe driving device having the ability to interact with the at least one mobile electronic device, the at least one mobile electronic device programs, features, and components, thereby providing hands-free, voice-activated use of the at least one mobile electronic device and the motor vehicle safe driving device.

12. The motor vehicle safe driving device of claim 1, further comprising at least one software program and technology that provides the ability to verbally and audibly compose, edit, and send text messages, emails, instant messages; the at least one software program and technology provides the ability to read back, review, and edit the composed messages aloud, broadcasting them through the at least one speaker prior to sending; the at least one software program and technology provides the ability to receive text messages, emails, and instant messages, reading the received messages aloud and broadcasting them through the at least one speaker.

13. The motor vehicle safe driving device of claim 1, wherein at least one port on the housing allows the at least one mobile electronic device to plug-in to the motor vehicle safe driving device, allowing communication and interaction between the at least one mobile electronic device and the motor vehicle safe driving device, the at least one port providing the ability to charge the batteries of the at least one mobile electronic device.

14. The motor vehicle safe driving device of claim 1, further comprising at least one microphone through which voices and sounds can be received, programmed, recorded, and stored in to the memory, the at least one microphone having the ability to interact with the motor vehicle safe driving device.

15. The motor vehicle safe driving device of claim 1, wherein the motor vehicle safe driving device communicates and interacts with ignition system of the motor vehicle, wherein when at least one mobile electronic device is in the motor vehicle, the motor vehicle safe driving device communicates and interacts with the ignition system of the motor vehicle preventing the ignition system of the motor vehicle from powering-on, turning on, or starting until the at least one mobile electronic device is either powered off or secured in the at least one compartment of the motor vehicle safe driving device; until the at least one mobile electronic device in the motor vehicle is either powered off, detected, identified, and located in a passenger area of the motor vehicle and not in the area of the operator or driver of the motor vehicle, or secured in the at least one compartment of the motor vehicle safe driving device.

16. The motor vehicle safe driving device of claim 1, further comprising a record button on the housing that permits recording of sounds through the at least one microphone.

17. The motor vehicle safe driving device of claim 1, further comprising at least one speaker through which audio sounds, voices, and music can be broadcast.

18. The motor vehicle safe driving device of claim 1, further comprising a volume control on the housing that controls the volume of the at least one speaker.

19. The motor vehicle safe driving device of claim 1, further comprising at least one geographical location and positioning system, technology, components, and services.

20. The motor vehicle safe driving device of claim 1, further comprising a fourth or more sensors from the at least one sensor from multiple sensors on one or more doors of the motor vehicle, wherein the fourth or more sensors from the at least one sensor from multiple sensors detects, locates, identifies, and monitors the location of the at least one mobile electronic device in the motor vehicle, the fourth or more sensors from the at least one sensor from multiple sensors communicates the location of the at least one mobile electronic device to the motor vehicle safe driving device, the motor vehicle safe driving device allowing or disabling the functionality of the display screen of the at least one mobile electronic device based on the location and orientation of the at least one mobile electronic device to the operator or driver of the motor vehicle; based on if the forward, drive, or reverse transmission mechanisms of the motor vehicle are engaged.

21. The motor vehicle safe driving device of claim 1, further comprising at least one system integrity monitoring program and software application, the at least one system integrity monitoring program and software application preventing circumvention of the motor vehicle safe driving device and the motor vehicle safe driving device's hardware components and features, the motor vehicle safe driving device's software programs and applications; the at least one system integrity monitoring program and software application monitors the motor vehicle safe driving device for modifications to the hardware, software, components, functions, features, and related components of the motor vehicle safe driving device, wherein if the at least one system integrity monitoring program and software application identifies a modification to the hardware, software, components, functions, features, and related components of the motor vehicle safe driving device, the at least one system integrity monitoring program and software application determines if the modification to the hardware, software, components, functions, features, and related components of the motor vehicle safe driving device is by an authorized person, certified person, unauthorized person, uncertified person; wherein if the at least one system integrity monitoring program and software application determines the modification to the hardware, software, components, functions, features, and related components of the motor vehicle safe driving device is by an unauthorized person, uncertified person, the at least one system integrity monitoring program and software application prevents the engagement of the forward, drive, and reverse transmission mechanisms of the motor vehicle in which the modified motor vehicle safe driving device is located; wherein if the at least one system integrity monitoring program and software application determines the modification to the hardware, software, components, functions, features, and related components of the motor vehicle safe driving device is by an unauthorized person, uncertified person, the at least one system integrity monitoring program and software application communicates to law enforcement, and other authorized enforcement entities, the modification and identifies the motor vehicle in which the modified motor vehicle safe driving device is located; wherein the at least one system integrity monitoring program and software application identifies a modification to the hardware, software, components, functions, features, and related components of the motor vehicle safe driving device, the at least one system integrity monitoring program and software application creates a modification log entry to preserve and store the modification and the person(s) who made the modification; wherein the at least one system integrity monitoring program and software application requires a certification identification, authorization code to be entered before a modification is made to the motor vehicle safe driving device; wherein an incorrect certification identification, authorization code is entered, the motor vehicle safe driving device prevents the engagement of the forward, drive, and reverse transmission mechanisms of the motor vehicle; wherein more than one incorrect certification identification, authorization code is entered, the motor vehicle safe driving device communicates the information to law enforcement, and other authorized enforcement entities.

22. The motor vehicle safe driving device of claim 1, further comprising at least one security program and feature allowing one or more mobile electronic devices to be associated with a motor vehicle, wherein if the one or more mobile electronic devices are not in the motor vehicle, the motor vehicle cannot be started, powered on, and driven, thereby preventing unauthorized use of the motor vehicle; wherein if the at least one security program and feature is tampered with, the motor vehicle's transmission mechanisms are prevented from engaging; wherein if the at least one security program and feature detects the motor vehicle ignition is powered on or started by an abnormal means or method, the at least one security program and feature makes the motor vehicle undrivable; wherein the at least one security program and feature communicates with the one or more mobile electronic devices associated with the motor vehicle; wherein the at least one security program and feature communicates with law enforcement.

23. A method of preventing the hands-on use of at least one mobile electronic device while operating or driving a motor vehicle, comprising:

- connecting at least one motor vehicle safe driving device to the motor vehicle; the at least one motor vehicle safe driving device includes a housing including a compartment, memory in the housing, the memory storing data in to the motor vehicle safe driving device; at least one software application program for the at least one mobile electronic device allowing interaction between the at least one mobile electronic device and the motor vehicle safe driving device; at least one power source; at least one communication system providing interactive communication for the motor vehicle safe driving device, wherein the at least one communication system providing interactive communication between various features of the motor vehicle safe driving device, a motor vehicle's components and mechanisms, and the at least one mobile electronic device in the motor vehicle;
- a transmission control system, the transmission control system interacting with a transmission system and mechanisms of the motor vehicle, wherein the transmission control system communicates with the motor vehicle safe driving device to determine whether to allow or prohibit the engagement of a forward, drive, and reverse transmission mechanisms based on a location of the at least one mobile electronic device in the motor;
- at least one sensor from multiple sensors within the motor vehicle; a first or more sensors from the at least one sensor from multiple sensors attached to the motor vehicle safe driving device, wherein a first or more sensors from the at least one sensor from multiple sensors detecting, identifying, locating, and monitoring the at least one mobile electronic device in the motor vehicle and communicating the information of the at least one mobile electronic device to the motor vehicle safe driving device, wherein the motor vehicle safe driving device analyzing the received information, determining the location of the at least one mobile electronic device and its accessibility to the operator or driver of the motor vehicle, and communicating with the transmission control system;
- wherein if the motor vehicle's forward, drive, or reverse transmission mechanism is engaged, and the first or more sensors from the at least one sensor from multiple sensors attached to the motor vehicle safe driving device detecting, identifying, and locating the at least one mobile electronic device in an unsecure location, the motor vehicle safe driving device disabling a display screen of the at least one mobile electronic device in an unsecure location;
- a second or more sensors from the at least one sensor from multiple sensors; the second or more sensors from the at least one sensor from multiple sensors is in an at least one compartment having the ability to open and close, providing the capacity to hold and secure the at least one mobile electronic device, wherein the second or more sensors from the at least one sensor from multiple sensors detecting, identifying, locating, and monitoring the location of the at least one mobile electronic device while communicating with the motor vehicle safe driving device, and when the at least one mobile electronic device is removed from the at least one compartment while the forward, drive, or reverse transmission mechanism of the motor vehicle is engaged, the second or more sensors from the at least one sensor from multiple sensors communicates the location of the at least one mobile electronic device that has been removed from the at least one compartment to the motor vehicle safe driving device, the motor vehicle safe driving device communicates and interacts with the at least one mobile electronic device that has been removed from the at least one compartment and disables the display screen of the at least one mobile electronic device, until the at least one mobile electronic device is either powered off or returned to and secured in the at least one compartment; and
- wherein the second or more sensors from the at least one sensor from multiple sensors detects when the at least one mobile electronic device is removed from the at least one compartment while the transmission mechanism of the motor vehicle is in park, the second or more sensors from the at least one sensor from multiple sensors communicates the removal of the at least one mobile electronic device from the at least one compartment of the motor vehicle safe driving device, the motor vehicle safe driving device communicates and interacts with the transmission control system, the transmission control system communicates and interacts with the transmission system and mechanisms of the motor vehicle prohibiting the engagement of the forward, drive, and reverse transmission mechanisms of the motor vehicle until the at least one mobile electronic device is either powered off or secured in the at least one compartment.

* * * * *